United States Patent
Itogawa et al.

(10) Patent No.: US 11,881,788 B2
(45) Date of Patent: Jan. 23, 2024

(54) DC/DC CONVERTER AND POWER CONVERSION DEVICE

(71) Applicant: Mitsubishi Electric Corporation, Tokyo (JP)

(72) Inventors: Yuki Itogawa, Tokyo (JP); Yu Kawai, Tokyo (JP); Takeshi Amimoto, Tokyo (JP); Yusuke Higaki, Tokyo (JP); Tomoaki Kimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 119 days.

(21) Appl. No.: 17/770,323

(22) PCT Filed: Dec. 16, 2019

(86) PCT No.: PCT/JP2019/049203
§ 371 (c)(1),
(2) Date: Apr. 20, 2022

(87) PCT Pub. No.: WO2021/124408
PCT Pub. Date: Jun. 24, 2021

(65) Prior Publication Data
US 2022/0393606 A1    Dec. 8, 2022

(51) Int. Cl.
*H02M 3/335* (2006.01)
*H02M 1/00* (2006.01)
*H02M 1/08* (2006.01)

(52) U.S. Cl.
CPC ..... *H02M 3/33584* (2013.01); *H02M 1/0067* (2021.05); *H02M 1/08* (2013.01); *H02M 3/33573* (2021.05)

(58) Field of Classification Search
CPC ......... H02M 3/33584; H02M 3/33573; H02M 1/0067; H02M 1/08
See application file for complete search history.

(56) References Cited

U.S. PATENT DOCUMENTS

| 2015/0015181 A1* | 1/2015 | Kondo | H02M 3/33584 320/103 |
| 2016/0072312 A1* | 3/2016 | Ichikawa | H02M 3/158 307/104 |

(Continued)

FOREIGN PATENT DOCUMENTS

| JP | 2007-6653 A | 1/2007 |
| WO | 2010/107060 A1 | 9/2010 |
| WO | 2018/016106 A1 | 1/2018 |

OTHER PUBLICATIONS

International Search Report and Written Opinion dated Mar. 10, 2020, received for PCT Application PCT/JP2019/049203, Filed on Dec. 16, 2019, 8 pages including English Translation.

*Primary Examiner* — Jared Fureman
*Assistant Examiner* — Duc M Pham
(74) *Attorney, Agent, or Firm* — XSENSUS LLP

(57) ABSTRACT

In a DC/DC converter, in first power transmission in which power is transmitted from a first DC power source to a second DC power source, on/off drive of a positive electrode-side switching element and a negative electrode-side switching element is stopped in a third bridge circuit on the power-receiving side. When a power transmission amount by the first power transmission is smaller than a first reference value, a control circuit lowers the switching frequency of the switching elements of a first bridge circuit and a second bridge circuit on the power-transmitting side and a fourth bridge circuit on the power-receiving side, compared with when the power transmission amount is equal to or greater than the first reference value.

15 Claims, 18 Drawing Sheets

(56) References Cited

U.S. PATENT DOCUMENTS

| | | | |
|---|---|---|---|
| 2019/0020281 A1* | 1/2019 | Yang | H02M 7/5387 |
| 2019/0097543 A1* | 3/2019 | Achtzehn | H02M 3/33584 |
| 2019/0288606 A1 | 9/2019 | Higaki et al. | |
| 2019/0372471 A1* | 12/2019 | Peng | H02M 3/33584 |

* cited by examiner

DC/DC CONVERTER AND POWER CONVERSION DEVICE

CROSS-REFERENCE TO RELATED APPLICATION

The present application is based on PCT filing PCT/JP2019/049203, filed Dec. 16, 2019, the entire contents of which is incorporated herein by reference.

TECHNICAL FIELD

The present disclosure relates to a DC/DC converter and a power conversion device.

BACKGROUND ART

A DC/DC converter that performs bidirectional power transmission between two DC power sources is described, for example, in WO2018/016106 (PTL 1). In the DC/DC converter in PTL 1, a dual active bridge (DAB) circuit configuration is employed, in which a first converter of a full bridge circuit is provided on the first DC power source side and a second converter of a full bridge circuit is provided on the second DC power source side, with a transformer interposed therebetween.

In PTL 1, step-up operation is performed using the first reactor or the second reactor when voltage of the first DC power source or the second DC power source is higher than voltage generated in the first winding or the second winding of the transformer, that is, when the step-up operation is necessary. On the other hand, the step-up operation is not performed when voltage of the first DC power source or the second DC power source is lower than voltage generated in the first winding or the second winding of the transformer, that is, when step-down operation is necessary.

In the DC/DC converter described in PTL 1, an operation mode of performing step-up operation (step-up charge) and an operation mode of performing step-down operation (step-down charge) in first power transmission (charge of the second DC power source) in which power is transmitted from the first DC power source to the second DC power source, and an operation mode of performing step-up operation (step-up discharge) and an operation mode of performing step-down operation (step-down discharge) in second power transmission (discharge of the second DC power source) in which power is transmitted from the second DC power source to the first DC power source, that is, in total, four operation modes can be switched according to the duty ratio representing the power transmission amount.

CITATION LIST

Patent Literature

PTL 1: WO2018/016106

SUMMARY OF INVENTION

Technical Problem

However, in the DC/DC converter in PTL 1, in the operation mode of performing step-down operation, both the upper arm and the lower arm are turned off in one of the legs (reference leg) on the power-receiving side, and the power transmission amount of the converter is reduced.

In general, power loss in the transformer tends to increase with increase in current, that is, the power transmission amount, whereas loss produced in one turning-on and off of a switching element is almost constant regardless of the power transmission amount. Therefore, in a region in which the power transmission amount is small, the ratio of switching loss to power loss in the entire DC/DC converter is large, which influences reduction of the power conversion efficiency.

The present disclosure is made in order to solve such a problem and an object of the present disclosure is to improve the power conversion efficiency of a DC/DC converter that performs bidirectional power transmission between first and second DC power sources.

Solution to Problem

In an aspect of the present disclosure, a DC/DC converter that performs bidirectional power transmission between a first DC power source and a second DC power source includes a transformer, first and second converters, and a control circuit. The transformer has a first winding and a second winding magnetically coupled. The first converter is connected between the first DC power source and the first winding. The second converter is connected between the second DC power source and the second winding. The first converter includes a first bridge circuit and a second bridge circuit connected in parallel to each other to the first DC power source. Each of the first bridge circuit and the second bridge circuit has a positive electrode-side switching element and a negative electrode-side switching element connected in series between a positive electrode and a negative electrode of the first DC power source. The first winding is connected between a connection point of the positive electrode-side switching element and the negative electrode-side switching element of the first bridge circuit and a connection point of the positive electrode-side switching element and the negative electrode-side switching element of the second bridge circuit. The second converter includes a third bridge circuit and a fourth bridge circuit connected in parallel to each other to the second DC power source. Each of the third bridge circuit and the fourth bridge circuit has a positive electrode-side switching element and a negative electrode-side switching element connected in series between a positive electrode and a negative electrode of the second DC power source. The second winding is connected between a connection point of the positive electrode-side switching element and the negative electrode-side switching element of the third bridge circuit and a connection point of the positive electrode-side switching element and the negative electrode-side switching element of the fourth bridge circuit. The control circuit performs on/off drive control of the respective positive electrode-side switching elements and the respective negative electrode-side switching elements of the first converter and the second converter. In first power transmission in which power is transmitted from the first DC power source to the second DC power source, in the first converter, the control circuit performs DC/AC power conversion by performing on/off drive control of the positive electrode-side switching element and the negative electrode-side switching element in each of the first bridge circuit and the second bridge circuit. In the first power transmission, in the second converter, the control circuit performs AC/DC power conversion by stopping on/off drive of the positive electrode-side switching element and the negative electrode-side switching element in the third bridge circuit and performing on/off drive control of the positive electrode-side switching element and the negative electrode-side switching element in the fourth bridge circuit. When a first power transmission amount by the first power transmission is smaller than a first reference value, the control circuit lowers a switching frequency for driving on and off of the respective positive electrode-side switching elements and the respective negative electrode-side switching elements of the first bridge circuit, the second bridge circuit, and the fourth bridge circuit, compared with when the first power transmission amount is equal to or greater than the first reference value.

Advantageous Effects of Invention

According to the present disclosure, in a DC/DC converter in which circuit operation is performed to keep the off state of the positive electrode-side and negative electrode-side switching elements in one bridge circuit on the power-receiving side at the time of power transmission, the switching frequency is lowered in accordance with a margin of the VT product applied to the transformer in a region in which the power transmission amount is smaller than a reference value, thereby reducing switching loss and thus improving the power conversion efficiency.

DESCRIPTION OF EMBODIMENTS

Figure 1:
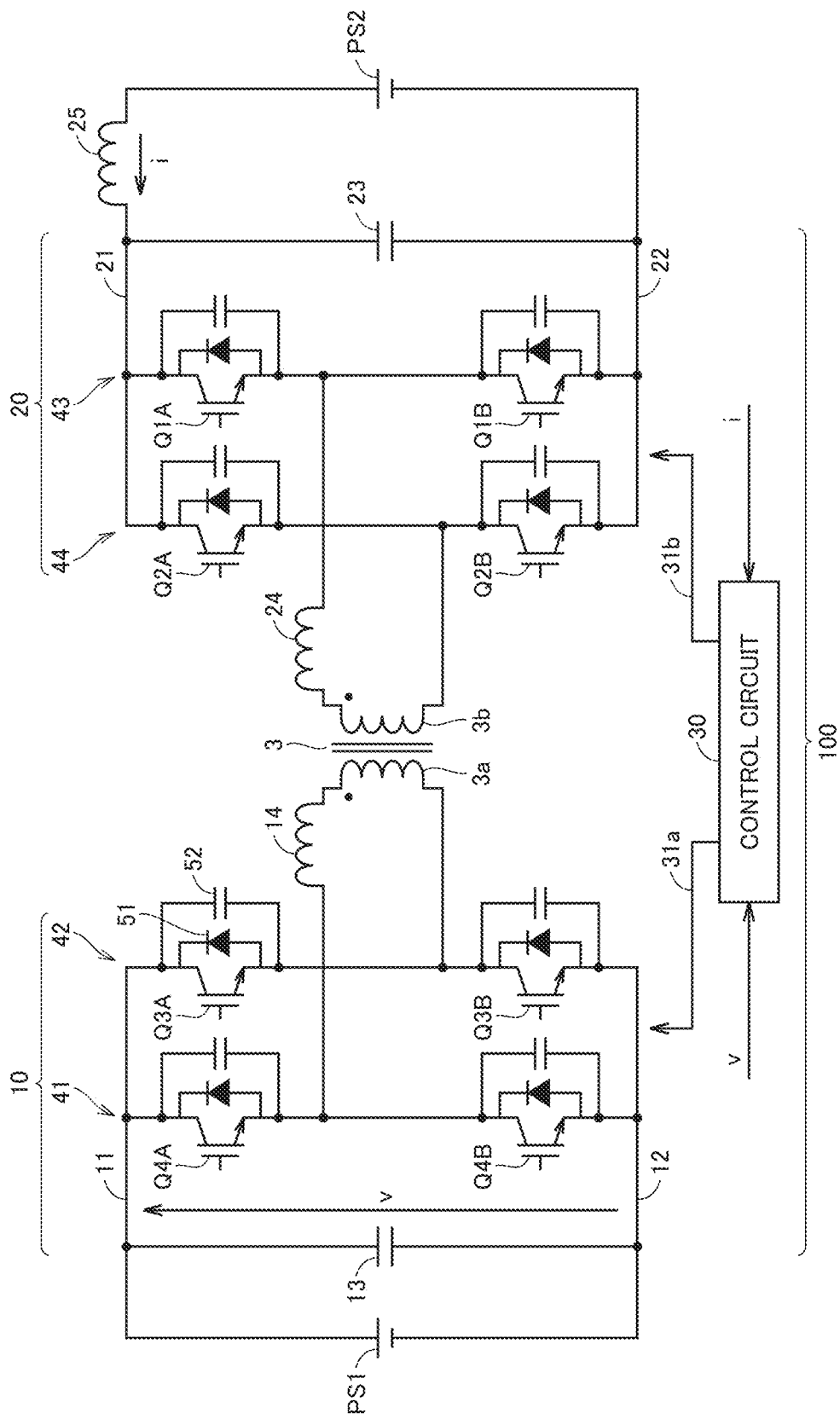
FIG. 1 is a schematic circuit configuration diagram of a DC/DC converter according to a first embodiment.

Embodiments of the present disclosure will be described in detail below with reference to the drawings. In the following, like or corresponding parts in the drawings are denoted by like reference signs and a description thereof is basically not repeated.

First Embodiment (Circuit Configuration)

FIG. 1 is a schematic circuit configuration diagram of a DC/DC converter 100 according to a first embodiment. DC/DC converter 100 performs bidirectional power transmission between a first DC power source PS1 and a second DC power source PS2.

In the present embodiment, a description is premised on that second DC power source PS2 is configured with a battery. More specifically, DC/DC converter 100 operates as a battery charging/discharging device that charges and discharges the battery. In the following, first DC power source PS1 may be simply referred to as DC power source PS1, and second DC power source PS2 may be referred to as battery PS2. As will be described below, the configuration of DC/DC converter 100 according to the present embodiment is similar to the DC/DC converter described in PTL 1 and includes a DAB circuit.

DC/DC converter 100 includes a transformer 3, a first converter 10, a second converter 20, a first reactor 14, a second reactor 24, and a control circuit 30. Transformer 3 has a first winding 3a and a second winding 3b wound around a not-shown core. With electromagnetic induction between first winding 3a and second winding 3b magnetically coupled to each other, a circuit on the first winding 3a side connected to DC power source PS1 and a circuit on the second winding 3b side connected to battery PS2 can perform power transmission bidirectionally while being electrically insulated from each other.

First converter 10 is configured with a full bridge circuit including a first bridge circuit 41 and a second bridge circuit 42. First bridge circuit 41 includes semiconductor switching elements (hereinafter simply referred to as switching elements) Q4A and Q4B connected in series between a first positive electrode wire 11 and a first negative electrode wire 12. Second bridge circuit 42 includes switching elements Q3A and Q3B connected in series between first positive electrode wire 11 and first negative electrode wire 12.

In other words, first bridge circuit 41 is a series connection circuit of first switching element Q4A on the positive electrode side and first switching element Q4B on the negative electrode side. Second bridge circuit 42 is a series connection circuit of second switching element Q3A on the positive electrode side and second switching element Q3B on the negative electrode side.

First positive electrode wire 11 and first negative electrode wire 12 are electrically connected to the positive electrode and the negative electrode of DC power source PS1. The midpoint of first bridge circuit 41 and the midpoint of second bridge circuit 42 are respectively electrically connected to both terminals of first winding 3a. In each bridge circuit, the midpoint corresponds to a connection point between the positive electrode-side switching element and the negative electrode-side switching terminal. First converter 10 performs DC/AC bidirectional power conversion between DC power source PS1 and first winding 3a of transformer 3 through on/off control of switching elements Q3A, Q3B, Q4A, and Q4B.

Similarly, second converter 20 is configured with a full bridge circuit including a third bridge circuit 43 and a fourth bridge circuit 44. Third bridge circuit 43 includes switching elements Q1A and Q1B connected in series between a second positive electrode wire 21 and a second negative electrode wire 22. Fourth bridge circuit 44 includes switching elements Q2A and Q2B connected in series between second positive electrode wire 21 and second negative electrode wire 22. Third bridge circuit 43 is a series connection circuit of third switching element Q1A on the positive electrode side and third switching element Q1B on the negative electrode side. Fourth bridge circuit 44 is a series connection circuit of fourth switching element Q2A on the positive electrode side and fourth switching element Q2B on the negative electrode side.

In each of first bridge circuit 41, second bridge circuit 42, third bridge circuit 43, and fourth bridge circuit 44, a plurality of switching elements may be arranged on each of the positive electrode side and the negative electrode side. Switching elements Q1A to Q4A and Q1B to Q4B may be any switching elements that can be on/off controlled by a control signal from control circuit 30, such as insulated gate bipolar transistors (IGBTs) or metal oxide semiconductor field effect transistors (MOSFETs).

A diode 51 (hereinafter may be referred to as antiparallel diode 51) is connected in antiparallel with each of switching elements Q1A to Q4A and Q1B to Q4B. To turn on and off each of switching elements Q1A to Q4A and Q1B to Q4B, it is preferable to apply zero voltage switching in which terminal-to-terminal voltage of the switching element is almost zero at the time of switching. A capacitor 52 (hereinafter may be referred to as parallel capacitor 52) is connected to each of switching elements Q1A to Q4A and Q1B to Q4B, if necessary.

Second positive electrode wire 21 and second negative electrode wire 22 are electrically connected to the positive electrode and the negative electrode of battery PS2. The midpoint of third bridge circuit 43 and the midpoint of fourth bridge circuit 44 are respectively electrically connected to both terminals of second winding 3b. Second converter 20 performs DC/AC bidirectional power conversion between battery PS2 and second winding 3b of transformer 3 through on/off control of switching elements Q1A, Q1B, Q2A, and Q2B.

On the first converter 10 side, first reactor 14 is connected in series in a connection path between first converter 10 and first winding 3a. In the present embodiment, first reactor 14 is connected in series in a connection path between the midpoint of first bridge circuit 41 and a first terminal of first winding 3a. Alternatively, first reactor 14 may be connected in series in a connection path between the midpoint of second bridge circuit 42 and a second terminal of first winding 3a. Furthermore, first converter 10 further includes a first smoothing capacitor 13 connected in parallel to DC power source PS1 between first positive electrode wire 11 and first negative electrode wire 12.

On the second converter 20 side, second reactor 24 is connected in series in a connection path between second converter 20 and second winding 3b. In the present embodiment, second reactor 24 is connected in series in a connection path between the midpoint of third bridge circuit 43 and a first terminal of second winding 3b. Alternatively, second reactor 24 may be connected in series in a connection path between the midpoint of fourth bridge circuit 44 and a second terminal of second winding 3b. Furthermore, second converter 20 further includes a second smoothing capacitor 23 connected in parallel to battery PS2 between second positive electrode wire 21 and second negative electrode wire 22. With first reactor 14 and second reactor 24, in DC/DC converter 100, inductance elements for excitation described later can be provided on a path including first converter 10 and first winding 3a and on a path including second converter 20 and second winding 3b. The arrangement of first reactor 14 and second reactor 24 is not essential, and the inductance element may be configured with leakage inductance of first winding 3a and second winding 3b.

However, if a reactor element is configured only with leakage inductance, adjustment of an inductance value is difficult. Moreover, increasing leakage inductance for adjustment of the inductance value may reduce the conversion efficiency in transformer 3. Therefore, external first reactor 14 and second reactor 24 may be arranged as necessary, so that the inductance value of the inductance element can be appropriately ensured without excessively increasing leakage inductance, thereby improving control stability and efficiency. Alternatively, an external reactor may be provided only on the primary side or the secondary side of transformer 3, that is, only one of first reactor 14 and second reactor 24 may be arranged.

First reactor 14 may be connected both between the midpoint of first bridge circuit 41 and the first terminal of first winding 3a and between the midpoint of second bridge circuit 42 and the second terminal of first winding 3a. Similarly, second reactor 24 may be connected both between the midpoint of third bridge circuit 43 and the first terminal of second winding 3b and between the midpoint of fourth bridge circuit 44 and the second terminal of second winding 3b.

A reactor 25 is connected in series to second positive electrode wire 21 between second smoothing capacitor 23 and battery PS2. Reactor 25 is provided with a not-shown current sensor for detecting charge/discharge current i (hereinafter simply referred to as "current i") of battery PS2. The current sensor may be provided on the side closer to second converter 20 than second smoothing capacitor 23. Current i is positive in the direction of arrow in FIG. 1. Therefore, current i is positive (i>0) at the time of discharge of battery PS2 and conversely, current i is negative (i<0) at the time of charge of battery PS2.

Furthermore, a voltage sensor (not shown) that detects terminal-to-terminal voltage of first smoothing capacitor 13 is provided in order to detect an output voltage v output from first converter 10 to DC power source PS1. Output signals of the current sensor and the voltage sensor are input to control circuit 30. Control circuit 30 can detect current i of battery PS2 and output voltage v of first converter 10, based on output signals from the current sensor and the voltage sensor.

Control circuit 30 includes a processing circuit to perform on/off drive control of each switching element. The processing circuit may be configured with a digital electronic circuit such as an arithmetic processing device and a storage device, may be configured with an analog electronic circuit such as a comparator, an operational amplifier, and a differential amplifier circuit, or may be configured with both of a digital electronic circuit and an analog electronic circuit.

Control circuit 30 generates a drive signal 31a for on/off drive control of each switching element Q3A, Q3B, Q4A, and Q4B of first converter 10 and a drive signal 31b for on/off drive control of each switching element Q1A, Q1B, Q2A, Q2B of second converter 20, based on the power transmission amount between DC power source PS1 and battery PS2.

In control circuit 30, an output DUTY ratio can be used as an intermediate variable representing the power transmission amount, in the same manner as in PTL 1. As will be described in detail later, control circuit 30 calculates the output DUTY ratio based on a command value for the transmission power amount and generates drive signals 31a and 31b for on/off drive control of each switching element in first converter 10 and second converter 20 based on the calculated output DUTY ratio. In doing so, control circuit 30 changes the output DUTY ratio that is an intermediate variable by feedback control described later such that the actual power transmission amount approaches the command value.

(Reference Element and Diagonal Element in DC/DC Converter)

Control circuit 30 sets one of the switching elements on the positive electrode side and the negative electrode side as a first reference element QB1 in first bridge circuit 41 and sets the switching element on the electrode side opposite to the first reference element in second bridge circuit 42 as a first diagonal element QO1 to control first converter 10. In the present embodiment, first switching element Q4A on the positive electrode side of first bridge circuit 41 is set as first reference element QB1, and in second bridge circuit 42, second switching element Q3B on the negative electrode side that is the opposite electrode to first reference element QB1 (positive electrode side) is set as first diagonal element QO1.

Alternatively, conversely, the bridge circuit of first converter 10 in which first reference element QB1 is set may be defined as first bridge circuit 41, and the bridge circuit of first converter 10 in which first diagonal element QO1 is set may be defined as second bridge circuit 42. In other words, one of switching elements Q3A and Q3B may be set as first reference element QB1, and one of switching elements Q4A and Q4B (the electrode side opposite to the first reference element) may be set as first diagonal element QO1.

Similarly, control circuit 30 sets one of the switching elements on the positive electrode side and the negative electrode side in third bridge circuit 43 as a second reference element QB2 and sets the switching element on the electrode side opposite to the second reference element in fourth bridge circuit 44 as a second diagonal element QO2 to control second converter 20. In the present embodiment, in third bridge circuit 43, third switching element Q1A on the same positive electrode side as in first bridge circuit 41 is set as second reference element QB2. In fourth bridge circuit 44, fourth switching element Q2B on the negative electrode side that is the opposite electrode to second reference element QB2 set as the positive electrode side is set as second diagonal element QO2.

Alternatively, also in second converter 20, the bridge circuit in second converter 20 in which second reference element QB2 is set may be defined as third bridge circuit 43, and the bridge circuit of second converter 20 in which second diagonal element QO2 is set may be defined as fourth bridge circuit 44. In other words, one of switching elements Q2A and Q2B may be set as second reference element QB2, and one of switching elements Q1A and Q1B (the electrode side opposite to the second reference element) may be set as second diagonal element QO2.

(Basic Control Behavior of First Power Transmission)

In DC/DC converter 100, first power transmission in which electric power is transmitted from DC power source PS1 to battery PS2, that is, battery PS2 is charged, and second power transmission in which electric power is transmitted from battery PS2 to DC power source PS1, that is, battery PS2 is discharged, are selectively performed. First, the circuit operation of first power transmission will be described.

The first power transmission includes charge of battery PS2 not involving step-up operation of second reactor 24 (which hereinafter may be referred to as step-down charge) and charge of battery PS2 involving step-up operation of second reactor 24 (which may be referred to as step-up charge).

Figure 2:
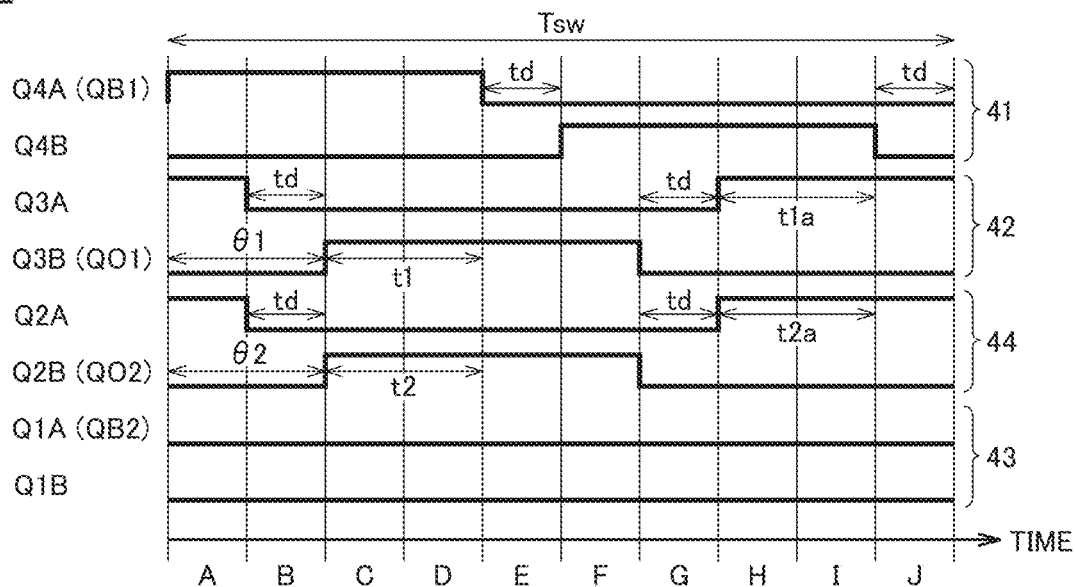
FIG. 2 is a time chart illustrating waveforms of on/off drive signals of switching elements in step-down charge of the DC/DC converter according to the first embodiment.

FIG. 2 shows a time chart illustrating waveforms of on/off drive signals of the switching elements in step-down charge of DC/DC converter 100 according to the first embodiment. In comparison, FIG. 3 shows a time chart illustrating waveforms of on/off drive signals of the switching elements in step-up charge of DC/DC converter 100 according to the first embodiment.

Figure 3:
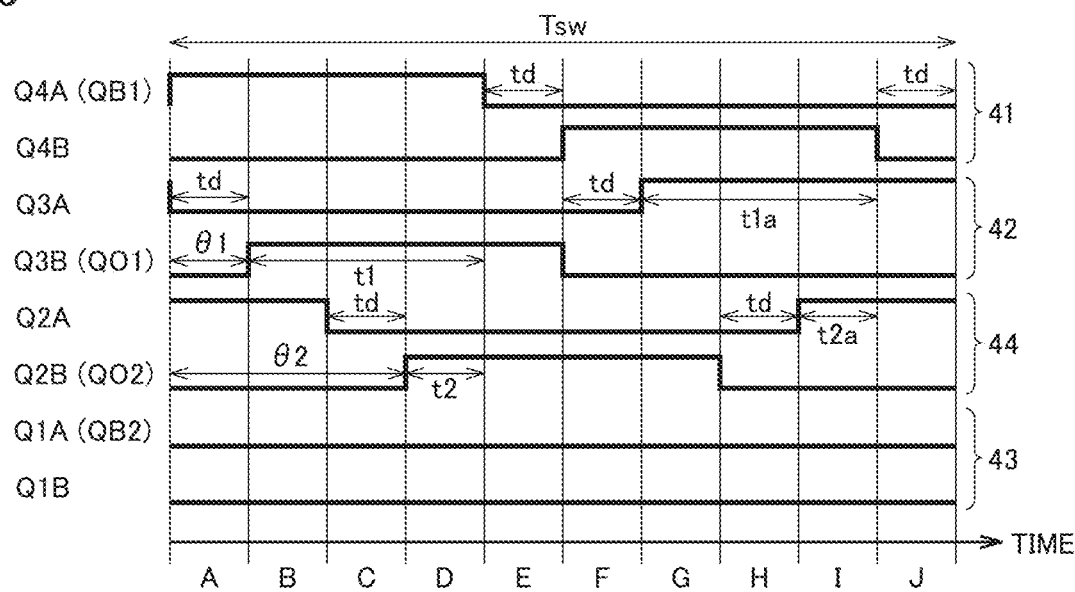
FIG. 3 is a time chart illustrating waveforms of on/off drive signals of switching elements in step-up charge of the DC/DC converter according to the first embodiment.

FIG. 2 and FIG. 3 show waveform examples for explaining the principle of step-down charge and step-up charge and strictly speaking do not agree with the control of a first phase shift amount $\theta 1$ and a second phase shift amount $\theta 2$ explained later with reference to FIG. 12 and the like. More specifically, in FIG. 2 and FIG. 3, for simplicity of explanation, a switching period Tsw of first bridge circuit 41 is divided into ten periods of periods A to J, and in each of periods A to J, a gate pattern that is a combination pattern of on or off drive signals of switching elements Q1A to Q4A and Q1B to Q4B is set.

Referring to FIG. 2, in the step-down charge operation that is the first power transmission not involving step-up operation, control circuit 30 alternately turns on switching elements Q3A, Q3B, Q4A, and Q4B on the positive electrode side and the negative electrode side in first bridge circuit 41 and second bridge circuit 42, once for each, at equal intervals in a preset switching period Tsw, in first converter 10.

On the other hand, in the step-down charge operation, control circuit 30 alternately turns on fourth switching elements Q2A and Q2B on the positive electrode side and the negative electrode side of fourth bridge circuit 44 once for each, at regular intervals in a preset switching period Tsw, and keeps third switching elements Q1A and Q1B on the positive electrode side and the negative electrode side of third bridge circuit 43 in the off state, in second converter 20.

In the present embodiment, control circuit 30 is configured such that the switching elements on the positive electrode side and the negative electrode side are alternately turned on at equal intervals with a short-circuit prevention time td interposed. In other words, the switching elements on the positive electrode side and the negative electrode side are each controlled at a 50% on-time ratio excluding the short-circuit prevention time td. The short-circuit prevention time td is a time period (called dead time) set for preventing simultaneous turning-on of the switching elements on the positive electrode side and the negative electrode side, and both of the switching elements on the positive electrode side and the negative electrode side are brought to the off state during the short-circuit prevention time td.

Specifically, for first bridge circuit 41, control circuit 30 turns on a drive signal to correspond to the ON period of first switching element Q4A on the positive electrode side and turns on a drive signal of first switching element Q4B on the negative electrode side after the lapse of the short-circuit prevention time td since turning-off of first switching element Q4A. The drive signal is turned on to correspond to the ON period of first switching element Q4B. After the elapse of the short-circuit prevention time td since turning-off of first switching element Q4B, a drive signal of first switching element Q4A on the positive electrode side is turned on again.

The short-circuit prevention time td is preset to correspond to the time required for the voltage at parallel capacitor 52 of each switching element to increase to the voltage at first smoothing capacitor 13 or the time required for the voltage at parallel capacitor 52 to decrease to the vicinity of zero voltage, when each switching element of first converter 10 is turned on. As a result, the ON time Ton of each switching element is denoted by Ton=(Tsw−2×td)/2 using the switching period Tsw and the short-circuit prevention time td.

In the case of the step-down charge operation in FIG. 2, control circuit 30 controls, as a first phase shift amount θ1, the phase shift amount of the on/off drive signal of first diagonal element QO1 (second switching element Q3B on the negative electrode side) with respect to the on/off drive signal of first reference element QB1 (first switching element Q4A on the positive electrode side). Furthermore, control circuit 30 controls, as a second phase shift amount θ2, the phase shift amount of the on/off drive signal of second diagonal element QO2 (fourth switching element Q2B on the negative electrode side) with respect to the on/off drive signal of first reference element QB1.

Control circuit 30 changes the first phase shift amount θ1 and the second phase shift amount θ2, based on the power transmission amount (in the present example, equivalent to the output DUTY ratio). In the present embodiment, the first phase shift amount θ1 and the second phase shift amount θ2 are phase shift amounts in the advance direction.

In the step-up charge operation in FIG. 3, control circuit 30 also sets, as the first phase shift amount θ1, the phase shift amount of the on/off drive signal of first diagonal element QO1 (second switching element Q3B on the negative electrode side) with respect to the on/off drive signal of first reference element QB1 (first switching element Q4A on the positive electrode side) and sets, as the second phase shift amount θ2, the phase shift amount of the on/off drive signal of second diagonal element QO2 (fourth switching element Q2B on the negative electrode side) with respect to the on/off drive signal of first reference element QB1 to perform control.

Control circuit 30 changes the first phase shift amount θ1 and the second phase shift amount θ2, based on the power transmission amount (the output DUTY ratio). In FIG. 3 also, the first phase shift amount θ1 and the second phase shift amount θ2 are phase shift amounts in the advance direction. In the case of the step-up charge operation in FIG. 3, the second phase shift amount θ2 is a value greater than the first phase shift amount θ1.

Here, referring to FIG. 2 and FIG. 3, the operation at the time of charge of battery PS2 will be described in detail.

When a period in which first reference element QB1 (first switching element Q4A on the positive electrode side) and first diagonal element QO1 (second switching element Q3B on the negative electrode side) are simultaneously on in step-down charge (FIG. 2) and step-up charge (FIG. 3) is defined as a first diagonal ON time t1, the first diagonal ON time t1 changes in accordance with the first phase shift amount θ1. Furthermore, the period in which first switching element Q4B on the negative electrode side and second switching element Q3A on the positive electrode side are simultaneously on (which may be referred to as first diagonal ON time t1a) is equal to the first diagonal ON time t1.

Furthermore, in the step-down discharge in FIG. 2, the on/off drive signals of first switching elements Q4A and Q4B of first bridge circuit 41 are set as virtual on/off drive signals of third switching elements Q1A and Q1B of third bridge circuit 43. Then, when a period in which the virtual on/off drive signal of second reference element QB2 (third switching element Q1A on the positive electrode side) and the on/off drive signal of second diagonal element QO2 (fourth switching element Q2B on the negative electrode side) are simultaneously on is set as a second virtual diagonal ON time t2, the second virtual diagonal ON time t2 changes in accordance with the second phase shift amount θ2. Furthermore, the second virtual diagonal ON time t2a in which the virtual on/off drive signal of third switching element Q1B on the negative electrode side and the on/off drive signal of fourth switching element Q2A on the positive electrode side are simultaneously on is also equal to the second virtual diagonal ON time t2.

In the step-up charge in FIG. 3, the on/off drive signals of first switching elements Q4A and Q4B of first bridge circuit 41 are also set as virtual on/off drive signals of third switching elements Q1A and Q1B of third bridge circuit 43. Then, when a period in which the virtual on/off drive signal of second reference element QB2 (third switching element Q1A on the positive electrode side) and the on/off drive signal of second diagonal element QO2 (fourth switching element Q2B on the negative electrode side) are simultaneously on is set as a second virtual diagonal ON time t2, the second virtual diagonal ON time t2 changes in accordance with the second phase shift amount θ2. Furthermore, the second virtual diagonal ON time t2a in which the virtual on/off drive signal of third switching element Q1B on the negative electrode side and the on/off drive signal of fourth switching element Q2A on the positive electrode side are simultaneously on is also equal to the second virtual diagonal ON time t2.

The circuit operation of DC/DC converter (battery charging/discharging device) 100 in step-down charge and step-up charge is similar to that of PTL 1, and the current path corresponding to each gate pattern shown in FIG. 3 (step-up charge) is described also in PTL 1 above.

Figure 4:
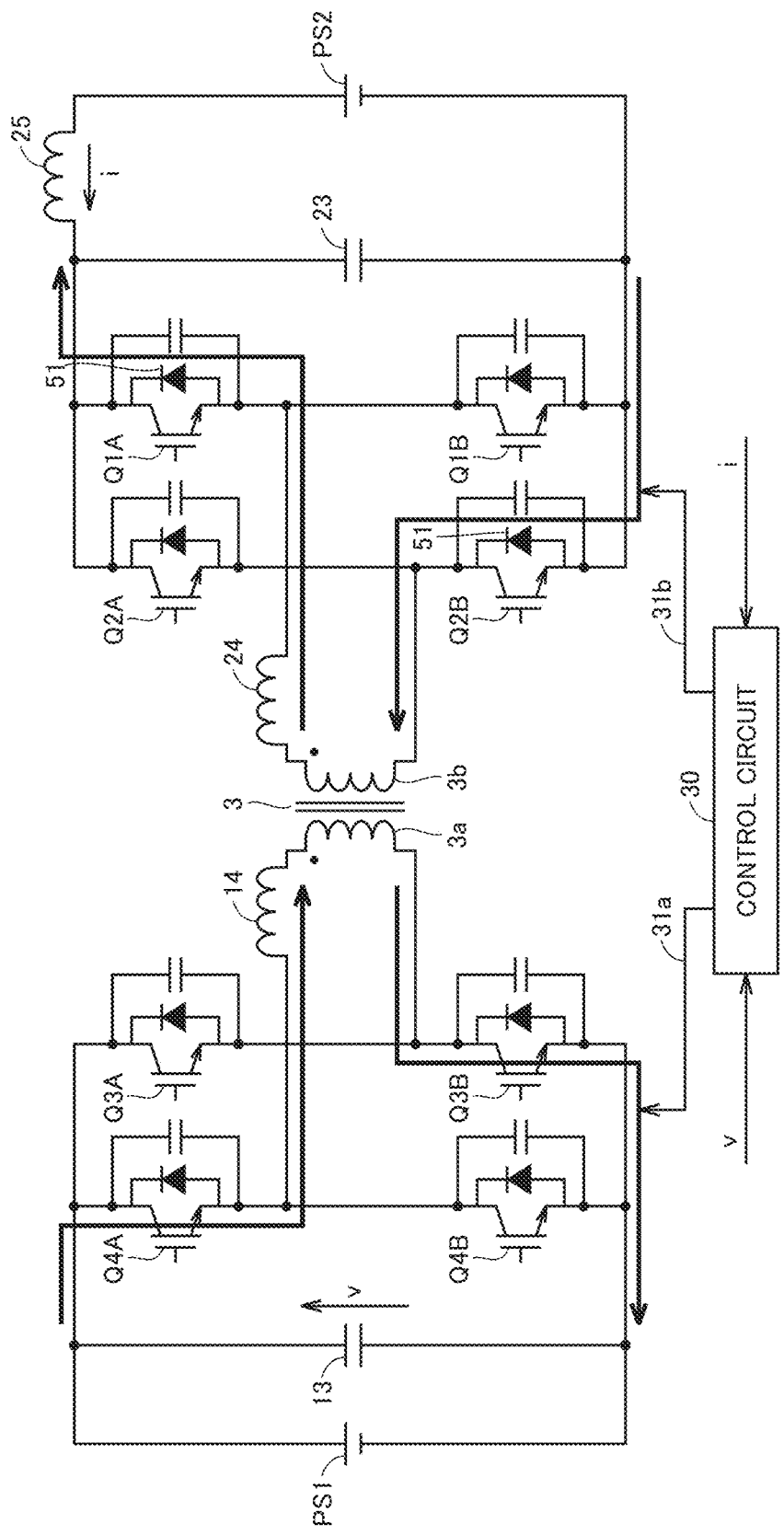
FIG. 4 is a first circuit diagram for explaining a current path in step-down charge operation according to FIG. 2.
Figure 5:
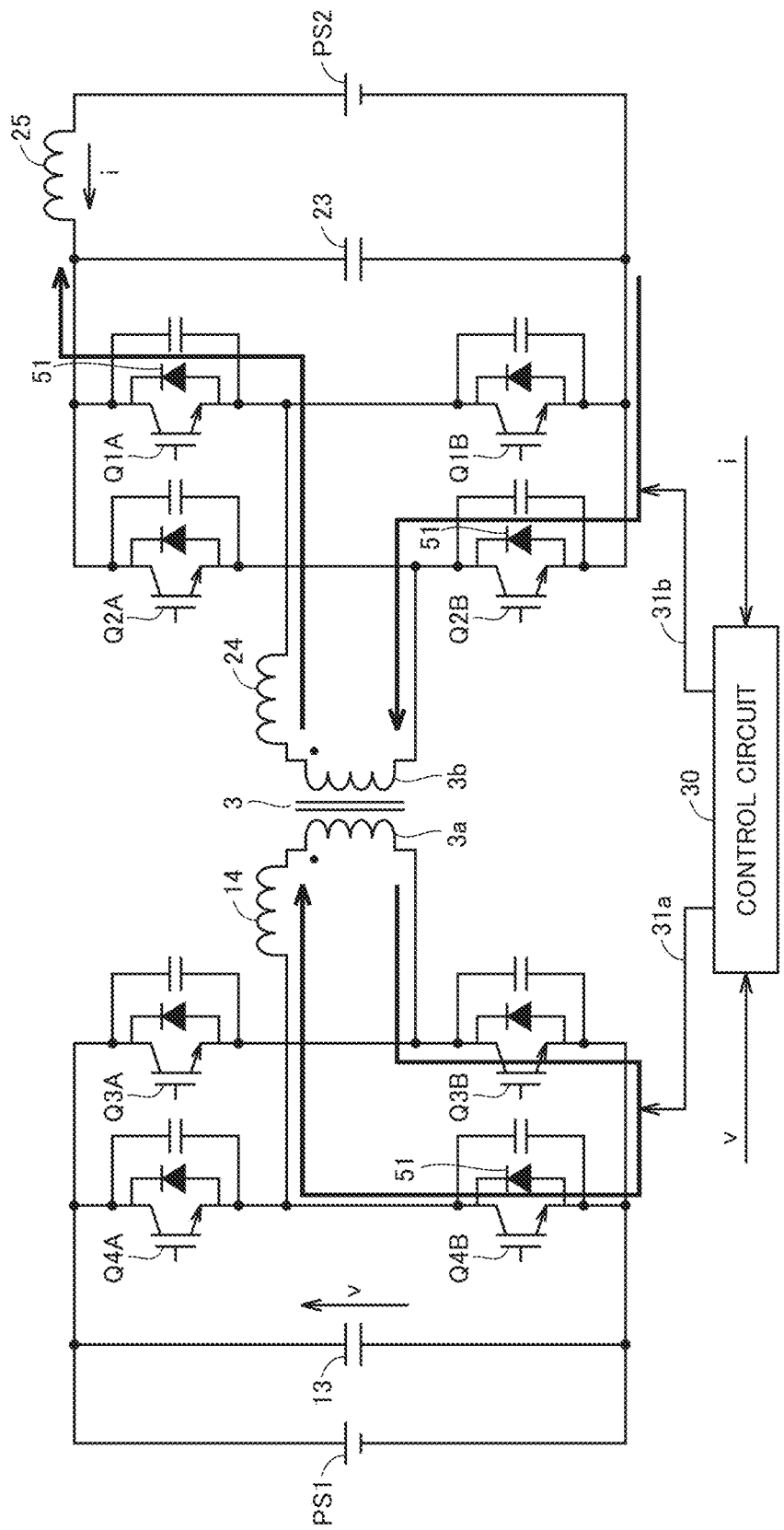
FIG. 5 is a second circuit diagram for explaining a current path in step-down charge operation according to FIG. 2.
Figure 6:
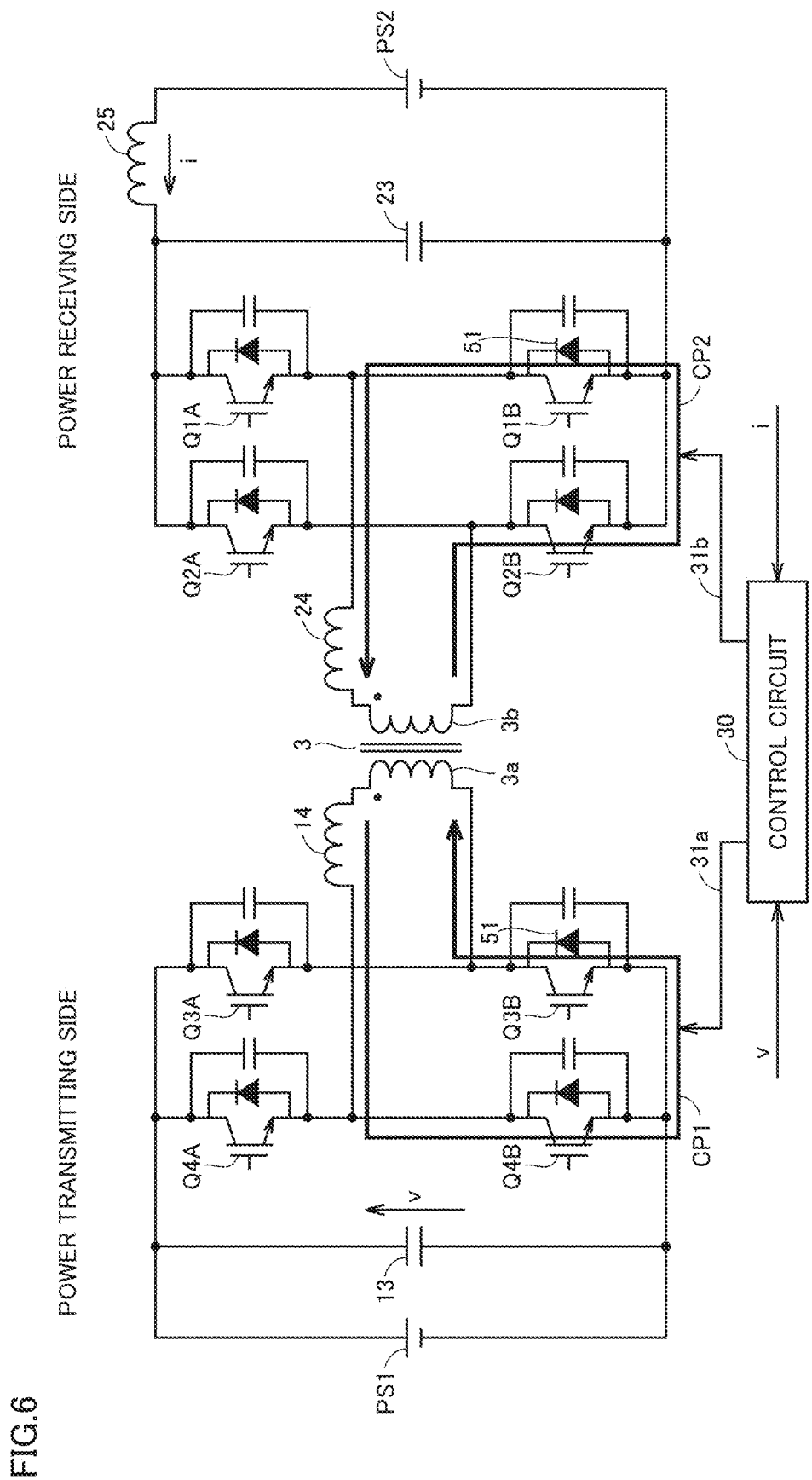
FIG. 6 is a third circuit diagram for explaining a current path in step-down charge operation according to FIG. 2.
Figure 7:
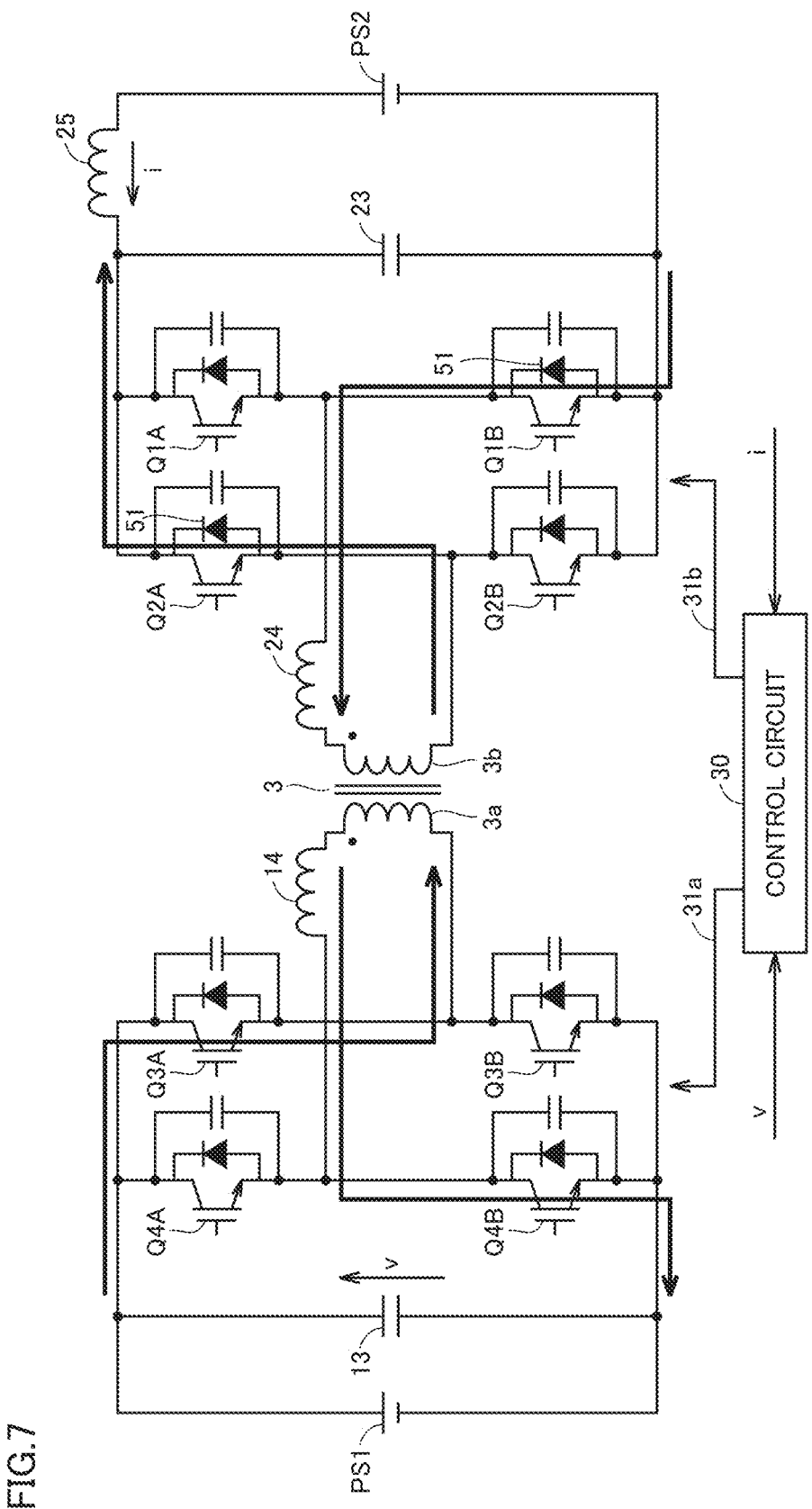
FIG. 7 is a fourth circuit diagram for explaining a current path in step-down charge operation according to FIG. 2.

FIG. 4 to FIG. 7 show current paths at the time of step-down charge. FIG. 4 shows a current path corresponding to the gate pattern in period C in FIG. 2, and FIG. 5 shows a current path corresponding to the gate pattern in period E in FIG. 2. FIG. 6 shows a current path corresponding to the gate pattern in period F in FIG. 2, and FIG. 7 shows a current path corresponding to the gate pattern in period H in FIG. 2.

Referring to FIG. 4, in period C in FIG. 2, since first switching element Q4A on the positive electrode side (first reference element QB1) and second switching element Q3B on the negative electrode side (first diagonal element QO1) simultaneously turn on in first converter 10, energy is transmitted from DC power source PS1 to first reactor 14 thereby exciting first reactor 14.

On the other hand, in period C, in second converter 20, fourth switching element Q2A on the positive electrode side turns off and fourth switching element Q2B on the negative electrode side is turned on, but a current path for charging battery PS2 is formed through antiparallel diode 51 of third switching element Q1A (off) on the positive electrode side and antiparallel diode 51 of fourth switching element Q2B (off) on the negative electrode side.

Referring to FIG. 5, in period E in FIG. 2, in first converter 10, first switching element Q4A on the positive electrode side is turned off. With turning-off of switching element Q4A, current in first converter 10 passes through a current path, not via DC power source PS1, through antiparallel diode 51 of first switching element Q4B on the negative electrode side and second switching element Q3B on the negative electrode side. At this moment, output voltage from DC power source PS1 is not applied to first winding 3a of transformer 3.

On the other hand, in second converter 20, a current path, similar to that in FIG. 4 (period C), via the antiparallel diodes 51 of switching element Q1A (off) and switching element Q2B is formed. As a result, energy of the excited first reactor 14 is transmitted toward battery PS2 via transformer 3.

When the circuit state in FIG. 5 continues, current flowing toward battery PS2 gradually decreases through the current path including antiparallel diodes 51 of switching element Q1A (off) and switching element Q2B (off) in second converter 20.

Referring to FIG. 6, in period F in FIG. 2, since switching element Q4B turns on in first converter 10, switching elements Q3B and Q4B are turned on. Switching element Q2B is kept on in second converter 20. As a result, in first converter 10, a current path CP1 including switching element Q4B and antiparallel diode 51 of switching element Q3B is formed. On the other hand, also in second converter 20, a current path CP2 including switching element Q2B and antiparallel diode 51 of switching element Q1B is formed.

As a result, DC/DC converter 100 has a period in which both of first converter 10 and second converter 20 output zero voltage to transformer 3 (hereinafter also referred to as "zero voltage period"). In the zero voltage period, while power transmission between DC power source PS1 and battery PS2 actually does not occur, circulating current is produced in first converter 10 and second converter 20 through transformer 3 through current paths CP1 and CP2.

In the zero voltage period, the voltage applied to first winding 3a and second winding 3b of transformer 3 is mainly the forward voltage of a switching element (IGBT) or antiparallel diode 51 and the potential difference due to resistance of conductors. These voltages are voltage in the direction opposite to that of the voltage applied to first winding 3a and second winding 3b in FIG. 4 and FIG. 5 and therefore operate in the direction to stop current flowing through transformer 3 in FIG. 5 and act in the direction to suppress bias magnetization produced in the transformer 3.

Referring to FIG. 7, in period H in FIG. 2, since second switching element Q3A on the positive electrode side is turned on, first reactor 14 is excited again by current through a path including second switching element Q3A on the positive electrode side and first switching element Q4B on the negative electrode side. After period H, the operation with a current direction opposite to that in periods C to G is repeated in first converter 10 and second converter 20, and the circuit operation will not be further elaborated.

In this way, it can be understood that in the step-down charge operation in FIG. 2, battery PS2 is charged without involving excitation of second reactor 24, that is, step-up operation. In the step-down charge operation, the zero voltage period occurs even in period A. In period A, a current path including switching element Q4A (on) and antiparallel diode 51 of switching element Q3A is formed in first converter 10, and a current path including switching element Q2A (on) and antiparallel diode 51 of switching element Q1A is formed in second converter 20.

The circuit operation of step-up charge of DC/DC converter 100 will now be described. As described above, the current path corresponding to each gate pattern shown in FIG. 3 is described also in PTL 1 above. Here, charge (step-up charge) of battery PS2 involving the step-up operation of second reactor 24 will be described by describing the current paths in period B and period C in FIG. 3.

Figure 8:
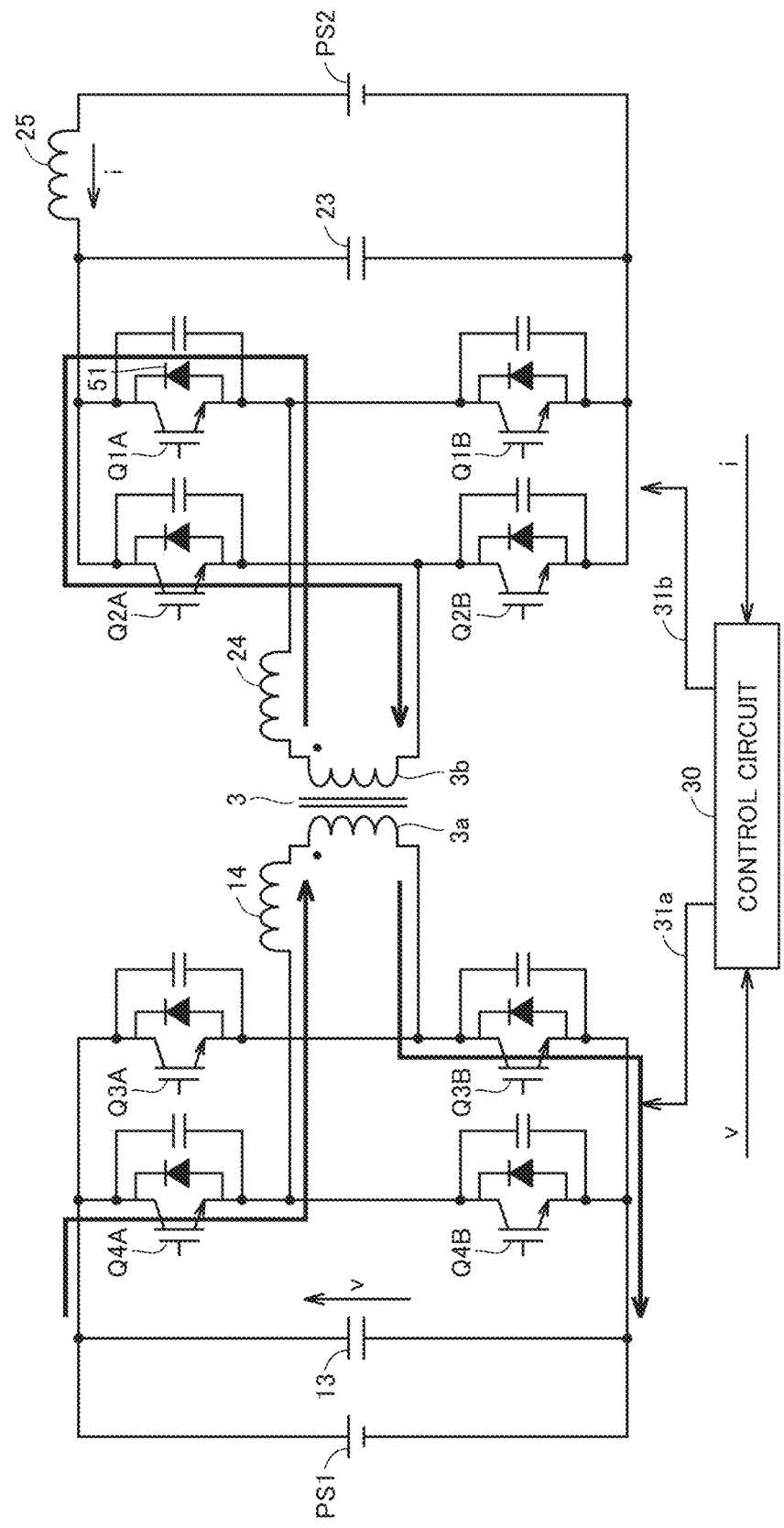
FIG. 8 is a first circuit diagram for explaining a current path in step-up charge operation according to FIG. 3.

FIG. 8 shows a current path corresponding to the gate pattern in period B in FIG. 3.

Referring to FIG. 8, in period B in FIG. 3, first switching element Q4A on the positive electrode side (first reference element QB1) and second switching element Q3B on the negative electrode side (first diagonal element QO1) are simultaneously on in first converter 10, and the diagonal two elements become electrically continuous. Therefore, current through first switching element Q4A on the positive electrode side and second switching element Q3B on the negative electrode side allows energy to be transmitted from the DC power source PS1 to first reactor 14 to excite first reactor 14.

In period B, fourth switching element Q2A on the positive electrode side is turned on in second converter 20. Therefore, current circulates through fourth switching element Q2A on the positive electrode side and antiparallel diode 51 of third switching element Q1A on the positive electrode side to second reactor 24. This current excites second reactor 24. As a result, in period B, first reactor 14 and second reactor 24 are excited. In the present embodiment, the operation in which the reactor on the power-receiving side is excited and consequently both of first reactor 14 and second reactor 24 are excited is referred to as step-up.

Figure 9:
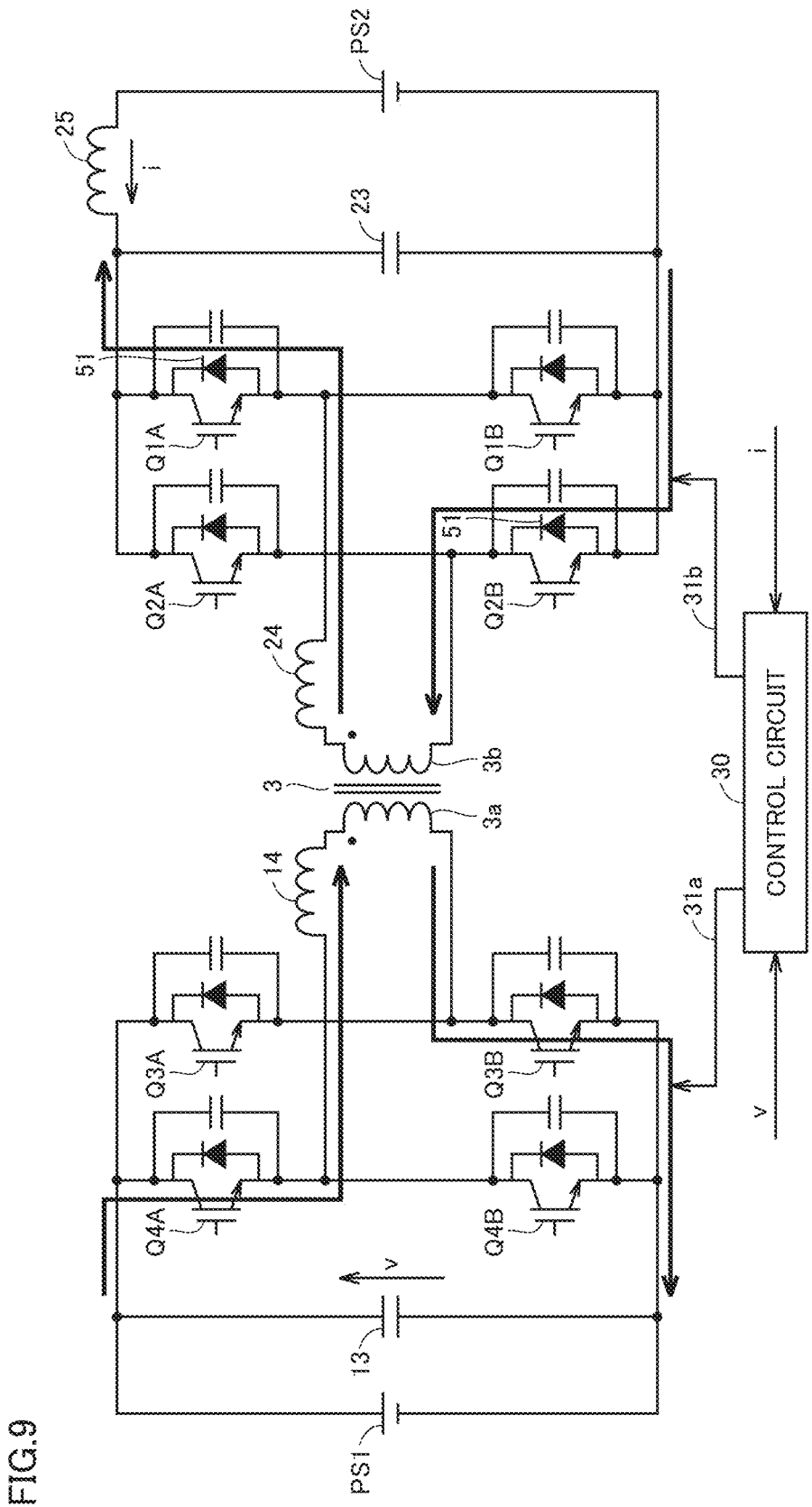
FIG. 9 is a second circuit diagram for explaining a current path in step-up charge operation according to FIG. 3.

FIG. 9 shows a current path corresponding to the gate pattern in period C in FIG. 3.

Referring to FIG. 9, in period C in FIG. 3 in the same manner as period B, first switching element Q4A on the positive electrode side (first reference element QB1) and second switching element Q3B on the negative electrode side (first diagonal element QO1) are simultaneously turned on in first converter 10, thereby exciting first reactor 14.

On the other hand, in period C, fourth switching element Q2A on the positive electrode side is turned off in second converter 20, and current flows toward battery PS2 through antiparallel diode 51 of third switching element Q1A on the positive electrode side and antiparallel diode 51 of fourth switching element Q2B on the negative electrode side.

Accordingly, in period C, excitation energy of first reactor 14 and second reactor 24 is transmitted toward battery PS2. Charge of battery PS2 (step-up charge) involving step-up operation of second reactor 24 is thus carried out. The zero voltage period also occurs at the time of step-up charge. For example, in FIG. 3, period A immediately before switching element Q3B turns on and period F immediately before switching element Q3A turns on are the zero voltage period.

(Basic Control Behavior of Second Power Transmission)

Next, the circuit operation of second power transmission in which power is transmitted from battery PS2 to DC power source PS1, that is, battery PS2 is discharged will be described. The second power transmission also includes discharge of battery PS2 not involving step-up operation of first reactor 14 on the power-receiving side (which hereinafter may be referred to as step-down discharge) and charge of battery PS2 involving step-up operation of first reactor 14 (which may be referred to as step-up discharge).

Figure 10:
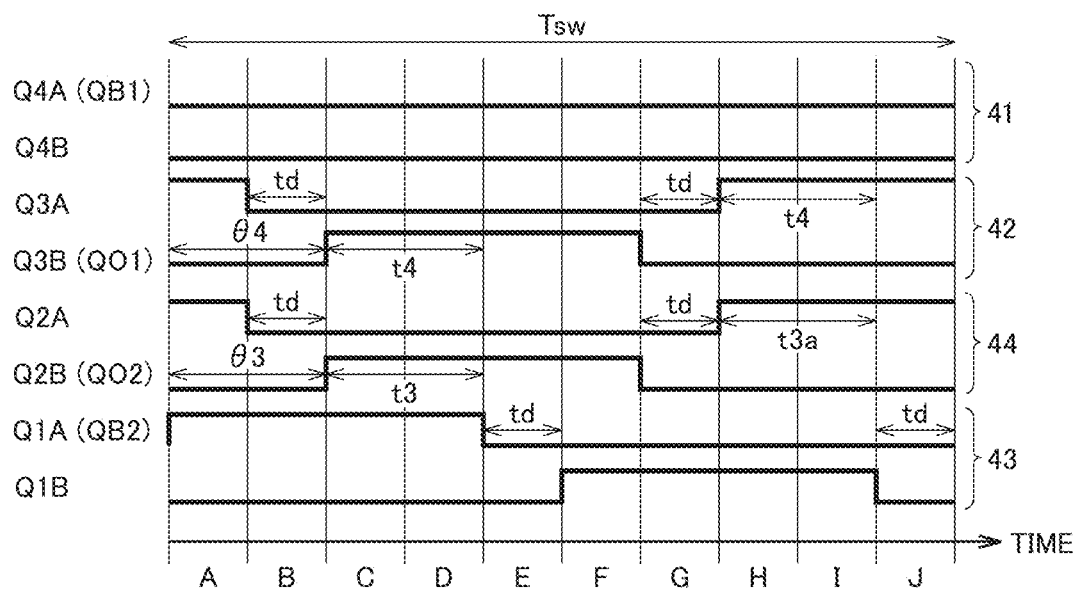
FIG. 10 is a time chart illustrating waveforms of on/off drive signals of switching elements in step-down discharge of DC/DC converter 100 according to the first embodiment.
Figure 11:
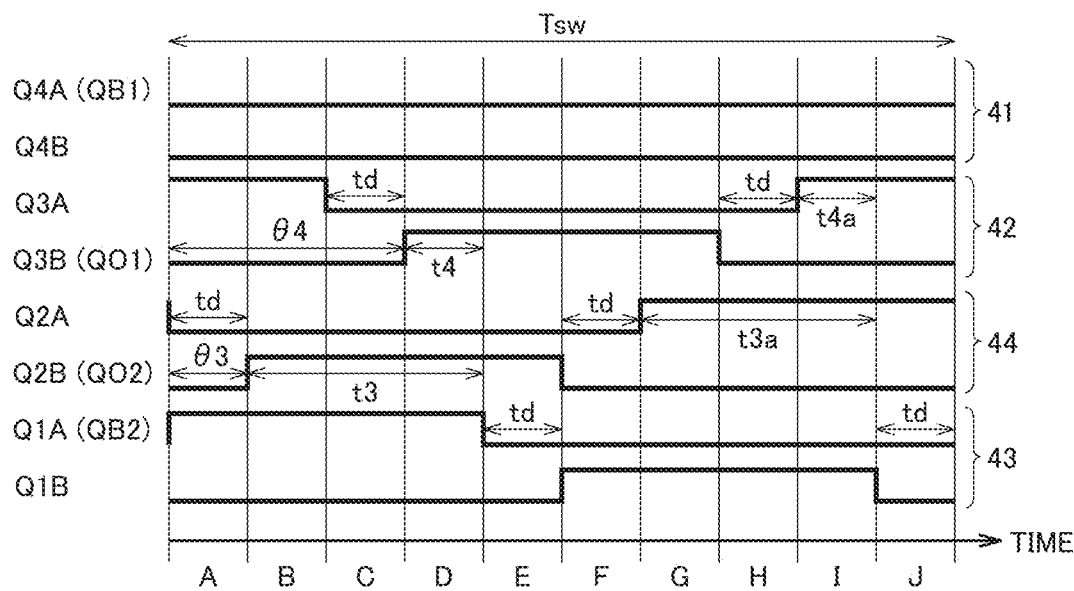
FIG. 11 is a time chart illustrating waveforms of on/off drive signals of switching elements in step-up discharge of the DC/DC converter according to the first embodiment.

FIG. 10 shows a time chart illustrating waveforms of on/off drive signals of the switching elements in step-down discharge of DC/DC converter 100 according to the first embodiment. FIG. 11 shows a time chart illustrating waveforms of on/off drive signals of the switching elements in step-up discharge of DC/DC converter 100 according to the first embodiment.

FIG. 10 and FIG. 11 also show waveform examples for explaining the principle of step-down charge and step-up charge, which strictly speaking do not agree with the control of a third phase shift amount θ3 and a fourth phase shift amount θ4 explained later. More specifically, also in FIG. 10 and FIG. 11, for simplicity of explanation, switching period Tsw of third bridge circuit 43 is divided into ten periods, namely, periods A to J, and in each of periods A to J, a gate pattern that is a combination pattern of the on or off drive signals of the switching elements is set.

Referring to FIG. 10, in the step-down discharge operation that is the second power transmission not involving step-up operation, control circuit 30 alternately turns on switching elements Q1A, Q1B, Q1A, and Q1B on the positive electrode side and the negative electrode side in third bridge circuit 43 and fourth bridge circuit 44, once for each, at equal intervals in a preset switching period Tsw.

On the other hand, in the step-down discharge operation, control circuit 30 alternately turns on second switching elements Q3A and Q3B on the positive electrode side and the negative electrode side of second bridge circuit 42 once for each, at regular intervals in a preset switching period Tsw, and keeps first switching elements Q4A and Q4B on the positive electrode side and the negative electrode side of first bridge circuit 41 in the off state.

In the present embodiment, control circuit 30 is configured such that the switching elements on the positive electrode side and the negative electrode side are alternately turned on at equal intervals with a short-circuit prevention time td interposed, even at the time of discharge of battery PS2 (second power transmission), in the same manner as at the time of charge of battery PS2 (first power transmission) described above.

In the second power transmission, control circuit 30 controls, as a third phase shift amount θ3, the phase shift amount of the on/off drive signal of second diagonal element QO2 (fourth switching element Q2B on the negative electrode side) with respect to the on/off drive signal of second reference element QB2 (third switching element Q1A on the positive electrode side). Further, control circuit 30 sets, as a fourth phase shift amount θ4, the phase shift amount of the on/off drive signal of first diagonal element QO1 (second switching element Q3B on the negative electrode side) with respect to the on/off drive signal of second reference element QB2 (third switching element Q1A on the positive electrode side).

Control circuit 30 changes the third phase shift amount θ3 and the fourth phase shift amount θ4, based on the power transmission amount from battery PS2 to DC power source PS1 (that is, the output DUTY ratio). The third phase shift amount θ3 and the fourth phase shift amount θ4 are phase shift amounts in the advance direction, in the same manner as the first phase shift amount θ1 and the second phase shift amount θ2 described above.

Referring to FIG. 11, also in the step-up discharge operation, control circuit 30 controls, as the third phase shift amount θ3, the phase shift amount of the on/off drive signal of second diagonal element QO2 (fourth switching element Q2B on the negative electrode side) with respect to the on/off drive signal of second reference element QB2 (third switching element Q1A on the positive electrode side). Furthermore, control circuit 30 sets, as the fourth phase shift amount θ4, the phase shift amount of the on/off drive signal of first diagonal element QO1 (second switching element Q3B on the negative electrode side) with respect to the on/off drive signal of second reference element QB2.

In the step-up discharge operation in FIG. 11, the fourth phase shift amount θ4 is a value greater than the third phase shift amount θ3. In comparison, in the step-down discharge operation in FIG. 10, the fourth phase shift amount θ4 is equal to the third phase shift amount θ3.

In the on/off drive signals of the switching elements at the time of step-down discharge shown in FIG. 10, the on/off drive signals of first switching elements Q4A and Q4B and the on/off drive signals of third switching elements Q1A and Q1B at the time of step-down charge shown in FIG. 2 are replaced with each other, and the on/off drive signals of second switching element Q3A and Q3B and the on/off drive signals of fourth switching elements Q2A and Q2B are replaced with each other.

Similarly, in the on/off drive signals of the switching elements at the time of step-up discharge shown in FIG. 11, the on/off drive signals of first switching elements Q4A and Q4B and the on/off drive signals of third switching elements Q1A and Q1B at the time of step-up charge shown in FIG. 3 are replaced with each other, and the on/off drive signals of second switching elements Q3A and Q3B and the on/off drive signals of fourth switching elements Q2A and Q2B are replaced with each other.

As shown in FIG. 10 and FIG. 11, when a period in which second reference element QB2 (third switching element Q1A on the positive electrode side) and second diagonal element QO2 (fourth switching element Q2B on the negative electrode side) are simultaneously on is defined as a third diagonal ON time t3, the third diagonal ON time t3 changes in accordance with the third phase shift amount θ3. Furthermore, a period in which third switching element Q1B on the negative electrode side and fourth switching element Q2A on the positive electrode side are simultaneously on (third diagonal ON time t3a) is equal to the third diagonal ON time t3.

Furthermore, in FIG. 10, the on/off drive signals of third switching elements Q1A and Q1B of third bridge circuit 43 are set as virtual on/off drive signals of first switching elements Q4A and Q4B of first bridge circuit 41. Then, when a period in which the virtual on/off drive signal of first reference element QB1 (first switching element Q4A on the positive electrode side) and the virtual on/off drive signal of first diagonal element QO1 (second switching element Q3B on the negative electrode side) are simultaneously on is set as a fourth virtual diagonal ON time t4, the fourth virtual diagonal ON time t4 changes in accordance with the fourth phase shift amount $\theta 4$. Furthermore, the fourth virtual diagonal ON time t4a in which the virtual on/off drive signal of first switching element Q4B on the negative electrode side and the virtual on/off drive signal of second switching element Q3A on the positive electrode side are simultaneously on is also equal to the fourth virtual diagonal ON time t4.

Furthermore, in the step-up discharge in FIG. 11, the on/off drive signals of third switching elements Q1A and Q1B of third bridge circuit 43 are set as virtual on/off drive signals of first switching elements Q4A and Q4B of first bridge circuit 41.

Then, when a period in which the virtual on/off drive signal of first reference element QB1 (first switching element Q4A on the positive electrode side) and the on/off drive signal of first diagonal element QO1 (second switching element Q3B on the negative electrode side) are simultaneously on is set as a fourth virtual diagonal ON time t4, the fourth virtual diagonal ON time t4 changes in accordance with the fourth phase shift amount $\theta 4$. Furthermore, the fourth virtual diagonal ON time t4a in which the virtual on/off drive signal of first switching element Q4B on the negative electrode side and the on/off drive signal of second switching element Q3A on the positive electrode side are simultaneously on is also equal to the fourth virtual diagonal ON time t4.

Even in the step-up discharge and the step-down discharge, a similar operation holds, where the operation of step-up charge and step-down charge described above using FIG. 3 and FIG. 4 and first converter 10 and second converter 20 are interchanged. Specifically, in the step-up discharge and the step-down discharge in which the gate patterns shown in FIG. 10 and FIG. 11 are applied, the circuit operations of first converter 10 and second converter 20 are interchanged for the step-up charge and the step-down charge illustrated in FIG. 4 to FIG. 9. The circuit operations in step-up discharge and step-down discharge therefore will not be further elaborated.

(Control of Phase Shift Amount Based on Power Transmission Amount)

Figure 12:
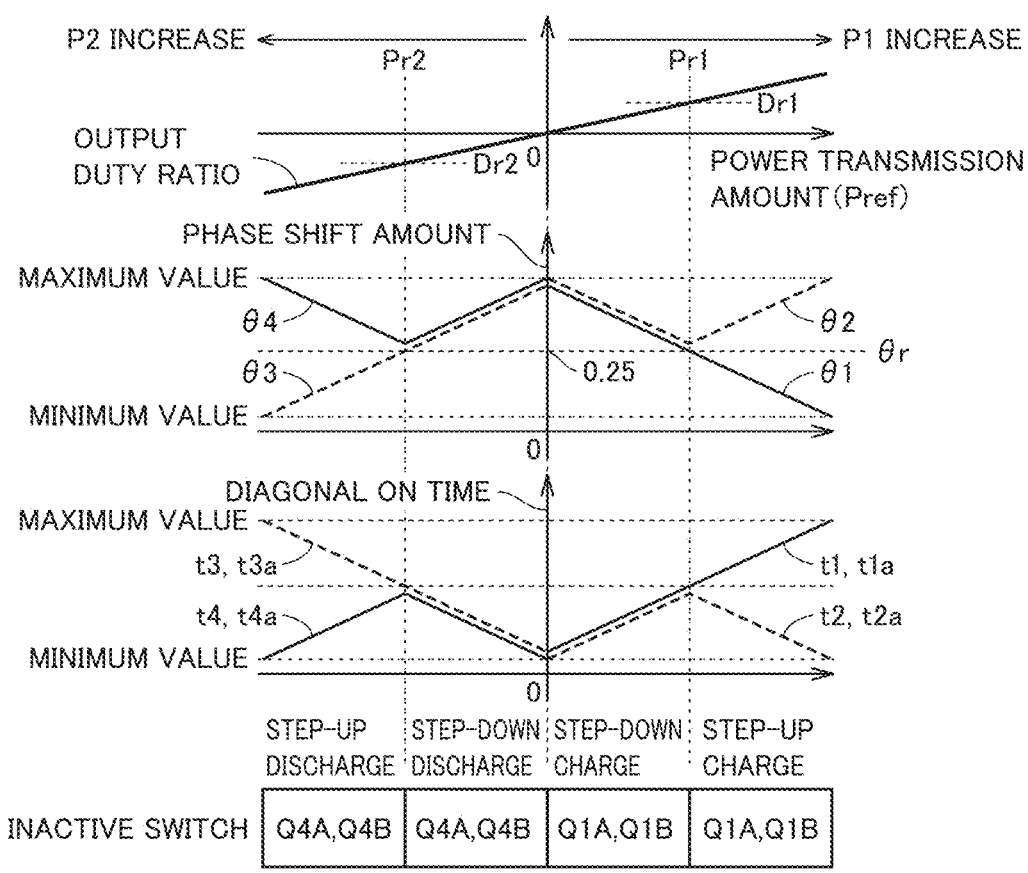
FIG. 12 is a graph for explaining control of a phase shift amount based on a power transmission amount in the DC/DC converter according to the first embodiment.

FIG. 12 is a graph for explaining control of a phase shift amount based on the power transmission amount in DC/DC converter 100 according to the first embodiment. The horizontal axes in three graphs in FIG. 12 show a power transmission amount P1 [W] from first DC power source PS1 to second DC power source (battery) PS2 and a power transmission amount P2 [W] from second DC power source (battery) PS2 to first DC power source PS1, in common. On the horizontal axes in FIG. 12, the power transmission amount P1 increases toward the right side, and the power transmission amount P2 increases toward the left side (P1>0, P2>0).

For example, as shown in the top graph in FIG. 12, control circuit 30 calculates the output DUTY ratio based on a power transmission command value Pref. In FIG. 12, when the first power transmission (charge of battery PS2) is performed, Pref=P1 (command value) is set. In comparison, when the second power transmission (discharge of battery PS2) is performed, Pref=−P2 (command value) is set. In this way, control circuit 30 can calculate the output DUTY ratio so that it is proportional to power transmission command value Pref.

(Control of Phase Shift Amount in First Power Transmission)

First, the case of the first power transmission (charge of battery PS2) will be described in detail. As shown in the right half of the middle graph in FIG. 12, control circuit 30 decreases the first phase shift amount $\theta 1$ as the power transmission amount P1, that is, the output DUTY ratio increases when the power transmission amount P1 is between 0 and the first reference value Pr1 (Pr1>0), in other words, the output DUTY ratio is between 0 and the first reference value Dr1 (Dr1>0). Furthermore, the second phase shift amount $\theta 2$ is also decreased by the same amount as in the first phase shift amount $\theta 1$, in accordance with the output DUTY ratio.

When P1=Pr1, the first phase shift amount $\theta 1$ and the second phase shift amount $\theta 2$ are set to the same amount. Hereinafter the first phase shift amount $\theta 1$ and the second phase shift amount $\theta 2$ at the switching point of P1=Pr1 may be referred to as reference phase shift amount $\theta r$. For example, the reference phase shift amount $\theta r$ can be preset to correspond to the power transmission amount P1 (output DUTY ratio) at which the first phase shift amount $\theta 1$ and the second phase shift amount $\theta 2$ are 25% of the switching period Tsw.

In the region of P1>Pr1, the control circuit 30 decreases the first phase shift amount $\theta 1$ and increases the second phase shift amount $\theta 2$ as the power transmission amount P1 (output DUTY ratio) increases. In other words, in the entire region of Pref>0, the first phase shift amount $\theta 1$ continuously decreases with increase of the power transmission amount P1 (output DUTY ratio). Therefore, in the region of P1>Pr1, $\theta 2>\theta 1$, and the phase difference $\Delta\theta$ ($\Delta\theta=\theta 2-\theta 1$) increases as the power transmission amount P1 (output DUTY ratio) increases.

In the first power transmission, when the voltage at DC power source PS1 on the input side is higher than the voltage at battery PS2 on the output side, the first reference value Pr1 agrees with the switching point of the step-down charge operation and the step-up charge operation. This is because power transmission involving step-up is unable to be performed with the setting of the first phase shift amount $\theta 1$ and the second phase shift amount $\theta 2$ in P1<Pr1.

When the power transmission amount P1 (output DUTY ratio) is between 0 and the first reference value Pr1, control circuit 30 decreases the first phase shift amount $\theta 1$ from the maximum value (in the present example, 45% of the switching period Tsw) to 25% of the switching period Tsw at a constant first slope (absolute value) relative to the increase of the power transmission amount P1 (output DUTY ratio).

When the power transmission amount P1 is between the first reference value Pr1 and twice (2·Pr1) the first reference value Pr1, control circuit 30 decreases the first phase shift amount $\theta 1$ from 25% of the switching period Tsw to the minimum value (in the present example, 5% of the switching period Tsw) at the same first slope (absolute value) as described above relative to the power transmission amount P1 (output DUTY ratio). At the same time, the second phase shift amount θ2, which is the same amount as the first phase shift amount θ1 at P=Pr1, is increased from 25% of the switching period Tsw to the maximum value at the same first slope (absolute value) as described above relative to increase of the power transmission amount P1 (output DUTY ratio). As a result, in the region in which the power transmission amount P1 (output DUTY ratio) is equal to or greater than the first reference value PR1, the sum of the first phase shift amount θ1 and the second phase shift amount θ2 is constant.

In DC/DC converter 100 according to the present embodiment, the power conversion efficiency is improved by further controlling the switching frequency of switching elements Q1A to Q4A and Q1B to Q4B, in addition to the phase shift amount, in accordance with the output DUTY ratio (that is, the power transmission amounts P1 and P2).

Figure 13:
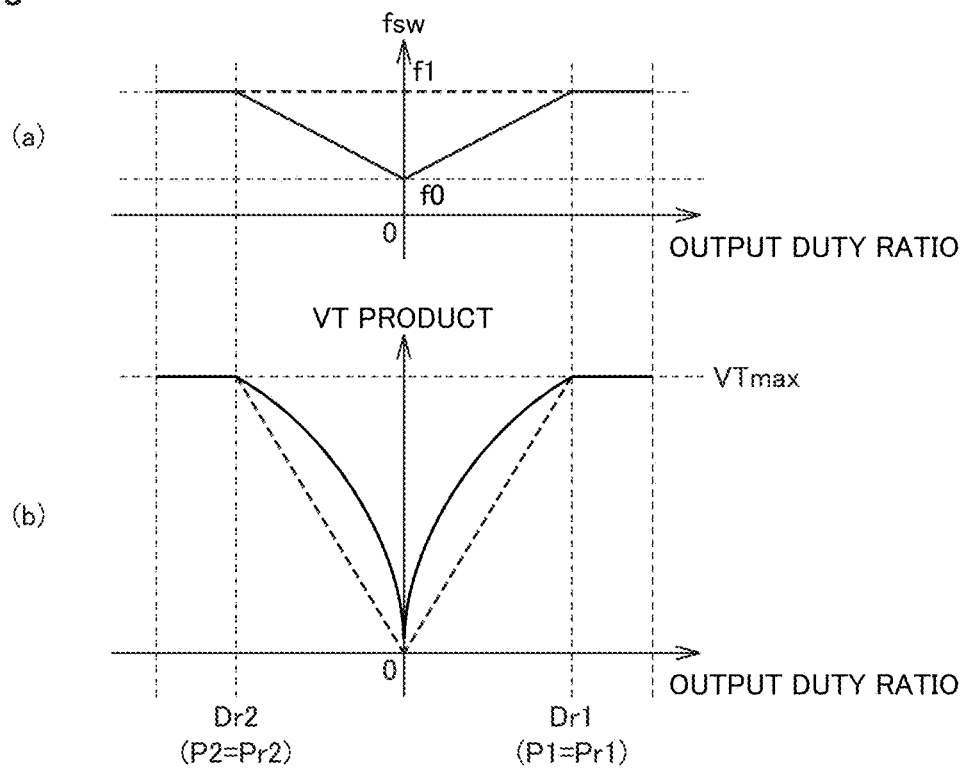
FIG. 13 is a graph for explaining control of switching frequency based on a power transmission amount in the DC/DC converter according to the first embodiment.

FIG. 13 is a graph for explaining control of switching frequency based on the power transmission amount in DC/DC converter 100 according to the first embodiment. The horizontal axis in (a) and (b) of FIG. 13 is the output DUTY ratio, (a) on the upper side shows the control of switching frequency fsw against the output DUTY ratio, and (b) shows change of the VT product (the product of voltage and time) of applied voltage to first winding 3a and second winding 3b of transformer 3 against the output DUTY ratio.

Referring to FIG. 13, the characteristic with a constant switching frequency (fsw=f1) for change of the output DUTY ratio is shown by a dotted line, as a comparative example. The VT product increases as the switching frequency increases, for the same output DUTY ratio. Furthermore, for the same switching frequency, the VT product increases in proportion to the sum of the first phase shift amount θ1 and the second phase shift amount θ2.

Therefore, when the switching frequency fsw is constant, as shown by the dotted line in FIG. 13(b), the VT product increases in proportion to the output DUTY ratio in the region in which the output DUTY ratio is smaller than the first reference value Dr1, that is, in the region of P1<Pr1 in FIG. 12.

On the other hand, in the region in which the output DUTY ratio is equal to or greater than the first reference value Dr1, as shown in the middle section in FIG. 12, the sum of the first phase shift amount θ1 and the second phase shift amount θ2 (that is, the sum of the first diagonal ON time t1, t1a and the second virtual diagonal ON time t2, t2a) is constant and therefore the VT product is also constant in the region in which the power transmission amount P1 (output DUTY ratio) is equal to or greater than the first reference value Pr1. The switching frequency f1 is determined such that the VT product maximum value (VTmax) in the region in which the output DUTY is large does not exceed the permissible maximum value (rated value) of transformer 3.

FIG. 13(b) suggests that in the region in which the output DUTY ratio is smaller than the first reference value Dr1, that is, in the region of P1<Pr1 in FIG. 12, the VT product of transformer 3 has a margin for the switching frequency fsw1=f1.

In DC/DC converter 100 according to the first embodiment, therefore, the switching frequency fsw in the region in which the output DUTY ratio is smaller than Dr1 (P1<Pr1) is lowered, compared with the switching frequency (fsw=f1) in the region of P1>Pr1. For example, as shown in FIG. 13(b), in the region in which the output DUTY ratio is equal to or greater than Dr1, fsw=f1 determined such that the maximum value VTmax of the VT product does not exceed the rated value of transformer 3 is fixed, whereas in the range in which the output DUTY ratio is between 0 and Dr1, the switching frequency fsw is controlled such that the switching frequency fsw changes from f0 to f1 as a linear function of the output DUTY ratio.

Next, the effect of reducing power conversion loss by reducing the switching frequency fsw in this way will be described.

Typically, when the switching frequency is reduced in a power converter, the peak value of current flowing through the reactor and the transformer rises. In the present embodiment, in each switching element Q1A to Q4A and Q1B to Q4B, zero voltage switching can be applied in which turn-off operation is performed in a state in which current flows in the forward direction through the switch, in the reference leg on the power-transmitting side and the shift leg on the power-receiving side. Furthermore, in the shift leg on the power-transmitting side, zero current switching can be applied in which a zero voltage period illustrated in FIG. 6 is provided so that turn-off operation is performed in a state in which current does not flow through the switch. Therefore, essentially, switching loss in the on/off operation in each switching element is extremely small, and when the switching frequency is reduced, the efficiency is naturally reduced due to increase in conduction loss due to increase in current peak value described above However, in DC/DC converter 100, when zero current switching operation is performed, power loss attributable to circulating current (FIG. 6) produced in the zero voltage period is produced. The inventors have found that when the switching frequency is lowered, the amount of switching loss reduction due to a smaller number of times of switching is greater than the amount of conduction loss increase due to the increase in current peak value.

In the DC/DC converter according to the present embodiment, therefore, as illustrated in FIG. 13(b), power loss can be reduced by lowering the switching frequency fsw in the region in which the output DUTY ratio is small with a margin in the VT product applied to transformer 3, that is, in the region in which the power transmission amount P1 is small (P1<Pr1). In this region, the power transmission amount is small and therefore the effect of the switching loss on the power conversion efficiency is large, and reduction of switching loss by lowering the switching frequency fsw significantly contributes to improvement of the power conversion efficiency.

As generally known, in two-level operation of a DAB circuit, changing the switching frequency in the middle of operation causes DC-biased magnetization due to imbalance of the VT product that occurs at the moment of switching. However, in the present embodiment, there is a zero current period in which the voltage applied to transformer 3 is zero, for each switching period. As described above, in the zero voltage period, a voltage is produced in the direction to stop current flowing through first winding 3a and second winding 3b of transformer 3 during power transmission, thereby suppressing the bias magnetization produced in transformer 3. Specifically, the magnetizing current of transformer 3 is suppressed most at the point of time when the zero voltage period ends, that is, at the timing immediately before switching of the shift leg on the power-transmitting side (for example, period B or period G in FIG. 2).

Therefore, in the zero voltage period, the length of the next switching period is determined from the switching frequency in accordance with the output DUTY ratio at this point of time, so that the switching frequency can be switched swiftly and safely in order to perform the switching frequency control described above without causing, for example, bias magnetization of transformer 3. For example, the switching point from period B to period C in FIG. 2 (step-down charge) can be set as the switching point of "switching period".

In the present embodiment, "zero voltage period" in which both of first converter 10 and second converter 20 output zero voltage means: a first period in which switching element Q3A (or antiparallel diode 51) and switching element Q4A (or antiparallel diode 51) are simultaneously electrically continuous in first converter 10 and switching element Q1A (or antiparallel diode 51) and switching element Q2A (or antiparallel diode 51) are simultaneously electrically continuous in second converter 20; and a second period in which switching element Q3B (or antiparallel diode 51) and switching element Q4B (or antiparallel diode 51) are simultaneously electrically continuous in first converter 10 and switching element Q1B (or antiparallel diode 51) and switching element Q2B (or antiparallel diode 51) are simultaneously electrically continuous in second converter 20.

Referring to FIG. 12 again, the bottom graph shows change of the first diagonal ON time t1, t1a and the second virtual diagonal ON time t2, t2a when control circuit 30 controls the first phase shift amount θ1 and the second phase shift amount θ2 as shown in the middle graph.

As described above, the first diagonal ON time t1, t1a is a value obtained by subtracting the first phase shift amount θ1 from the ON period of first reference element QB1. The second virtual diagonal ON time t2, t2a is a value obtained by subtracting the second phase shift amount θ2 from the ON period of first reference element QB1. Therefore, as shown in the bottom section in FIG. 12, the waveforms of the first diagonal ON time t1, t1a and the second virtual diagonal ON time t2, t2a have an upside-down shape of the waveforms of the first phase shift amount θ1 and the second phase shift amount θ2.

The circuit operation in the first power transmission (charge of battery PS2) will now be described in detail. The period in which power is transmitted from first winding 3a to second winding 3b of transformer 3 to produce a voltage in second winding 3b is the first diagonal ON time t1 in which first reference element QB1 (first switching element Q4A on the positive electrode side) and first diagonal element QO1 (second switching element Q3B on the negative electrode side) simultaneously turn on, and the first diagonal ON time t1a in which first switching element Q4B on the negative electrode side and second switching element Q3A on the positive electrode side simultaneously turn on.

At the time of step-down charge, the power transmission amount is controlled by adjusting the first diagonal ON time t1, t1a by adjusting the first phase shift amount θ1 in first converter 10. Furthermore, second converter 20 operates as a diode rectifying circuit by turning off both of the upper and lower third switching elements Q1A and Q1B of third bridge circuit 43. The range of change of the first phase shift amount θ1 at the time of step-down charge is the range from the maximum value to 25% of the switching period Tsw. As described above, the maximum value is set to a value equal to or smaller than 50% of the switching period Tsw and greater than 25% of the switching period Tsw (for example, 45% of Tsw).

The graph in FIG. 12 is the same as FIG. 11 in PTL 1. In PTL 1, the first phase shift amount θ1 and the second phase shift amount θ2 in the first power transmission are also controlled in the same manner as described above. In PTL 1, synchronous rectifying operation is also performed by changing the second phase shift amount θ2 to the same amount as the first phase shift amount θ1 to match the second virtual diagonal ON time t2, t2a with the first diagonal ON time t1, t1a.

However, even in PTL 1, as is significant in particular in the step-down charge operation, in an operating condition in which the output DUTY ratio is low and the first diagonal ON time t1, t1a is short, the zero voltage period described above in which power transmission operation actually does not take place is long. Therefore, in PTL 1 in which the switching frequency is not variably controlled, it is understood that in a region with a small output DUTY ratio, the VT product of applied voltage to transformer 3 is small in the same manner as indicated by the dotted line in FIG. 13(b), and the tolerance of the VT product of the core of transformer 3 is not effectively utilized, compared with the rated operation (maximum value VTmax).

In comparison, DC/DC converter 100 according to the first embodiment, the switching frequency of first converter 10 and second converter 20 is changed in accordance with increase/decrease of the output DUTY ratio (power transmission amount) shown in FIG. 13(a). In this configuration, the switching frequency fsw of first converter 10 and second converter 20 is reduced in the region in which the output DUTY ratio is low and the first diagonal time t1, t1a is small, whereby the VT product tolerance of transformer 3 is effectively utilized and the switching loss can be reduced.

When the switching frequency is reduced and the time per switching period is increased, the VT product applied to transformer 3 increases and current flowing through transformer 3 also increases, so that the iron loss and the copper loss of the transformer increases. However, it is known that the iron loss and the copper loss of transformer 3 have the property of increasing/decreasing in accordance with the power of the VT product applied to the transformer and the square of current. Therefore, when the DC/DC converter 100 is designed such that the loss in the entire DC/DC converter 100 is balanced in rated operation, the iron loss and the copper loss of transformer 3 are relatively small in the region in which the output capacity, that is, the power transmission amount is small, even when the VT product and the transformer current increases. In comparison, the switching loss is a fixed loss with a constant amount that is not influenced by the output capacity (power transmission amount).

In the region with a small power transmission amount, therefore, the proportion of the switching loss to the power loss in the entire DC/DC converter 100 is large. Thus, when the switching frequency is lowered, the effect of reducing the switching loss exceeds the increase of iron loss and copper loss in transformer 3 due to the increase of VT product and transformer current, whereby the loss in the entire DC/DC converter 100 can be reduced.

The relation between the output DUTY ratio and the switching frequency fsw shown in FIG. 13(a) is illustrated only by way of example, and the switching frequency fsw can be set freely to reduce the switching loss as long as the VT product of voltage applied to transformer 3 falls within a range equal to or smaller than the VT product tolerance (maximum value VTmax).

In DC/DC converter 100 according to the first embodiment, the bridge circuit on the power-receiving side operates as a diode rectifying circuit by keeping switching elements Q1A, Q1B (at the time of first power transmission) or switching elements Q4A, Q4B (at the time of second power transmission) of the reference leg on the power-receiving side in the off state, in the same manner as in PTL 1. Thus, when reactor current that has increased in a step-up period or a power transmission period is temporarily returned to zero for zero current switching, switching of applied voltage to transformer 3 automatically occurs at the point of time of zero current, independently of the length of the step-up period or the power transmission period.

Thus, even when there is disturbance such as change in input/output voltage or power transmission amount of DC/DC converter 100 in changing the switching frequency, the current waveform as intended can be achieved by utilizing the rectifying effect by the diode, and the effect of reducing switching loss can be ensured.

In comparison, when a similar converter operation is attempted by on/off drive of switching elements at the same timing as switching of the diode bridge, without keeping the switch element of the reference leg on the power-receiving side in the off state, the intended current waveform may fail to be achieved due to the influence of dead time or the influence of delay in the gate drive circuit in changing the switching frequency. Thus, zero current switching of the switching element of the reference leg is not always performed, and controlling the switching frequency may increase the switching loss. Turning on/off the switching elements based on the current detection value in order to avoid such a phenomenon requires additional arrangement of a current sensor.

In DC/DC converter 100 according to the first embodiment, since the rectifying effect by the diode is used in the bridge circuit on the power-receiving side as described above, the effect of reducing switching loss by variable control of the switching frequency can be achieved reliably without requiring the additional arrangement of a current sensor.

The operation at the time of step-up charge with a large power transmission amount P1 (output DUTY ratio) in the first power transmission will now be described in more detail.

Figure 14:
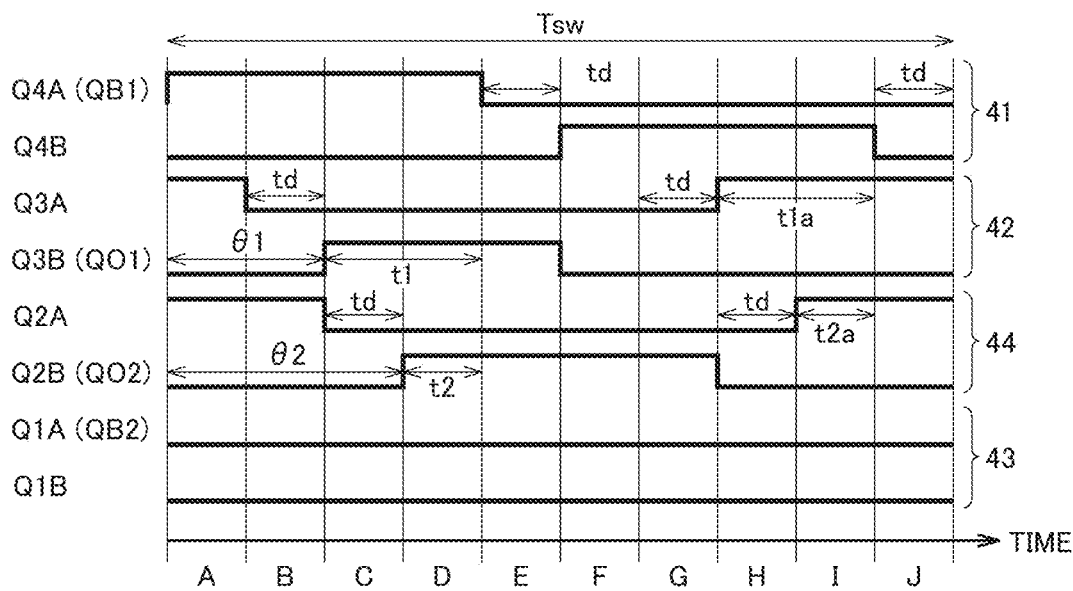
FIG. 14 is a time chart illustrating waveforms of on/off drive signals of switching elements when the phase difference between a first phase shift amount and a second phase shift amount is small in step-up charge by the DC/DC converter according to the first embodiment.

FIG. 14 is a time chart illustrating waveforms of on/off drive signals of the switching elements in step-up charge by the DC/DC converter according to the first embodiment. FIG. 14 shows the waveforms when the phase difference between the first phase shift amount the second phase shift amount is small. For example, the gate pattern in FIG. 14 occurs at the time of switching from step-down charge to step-up charge.

FIG. 14 shows a gate pattern when the first phase shift amount θ1 decreases from the reference phase shift amount θr (θr=Tsw×0.25) by Tsw×0.05 and conversely, the second phase shift amount θ2 increases from the reference phase shift amount θr by Tsw×0.05 in a region in which power transmission amount P1>Pr1 and step-up charge is applied in the graph in FIG. 12. Specifically, the first phase amount θ1 is 20% of the switching period Tsw and the second phase shift amount θ2 is 30% of the switching period Tsw. Thus, the phase difference between the first phase shift amount θ1 and the second phase shift amount θ2 is 10% of the switching period Tsw and equal to the short-circuit prevention time td.

Referring to FIG. 14, in period C, which is immediately after second switching element Q3B on the negative electrode side (first diagonal element QO1) of first converter 10 turns on, first switching element Q4A on the positive electrode side (first reference element QB1) and second switching element Q3B on the negative electrode side (first diagonal element QO1) simultaneously turn on, and the diagonal two elements become electrically continuous. Thus, energy is transmitted from DC power source PS1 to first reactor 14 through first switching element Q4A on the positive electrode side and second switching element Q3B on the negative electrode side to excite first reactor 14.

In FIG. 14, since the phase difference between the first phase shift amount θ1 and the second phase shift amount θ2 is equal to the short-circuit prevention time td, in second converter 20, period C is set as the short-circuit prevention time td for fourth switching elements Q2A and Q2B and fourth switching element Q2A on the positive electrode side is not turned on.

Therefore, in period C in FIG. 14, a current path including antiparallel diode 51 of third switching element Q1A on the positive electrode side and antiparallel diode 51 of fourth switching element Q2B on the negative electrode side is formed in the same manner as at the time of step-down operation as described with reference to FIG. 4. Thus, power is transmitted from DC power source PS1 to battery PS2 without involving excitation of second reactor 24.

In this way, in FIG. 14, even when power transmission amount P1 is greater than first reference value Pr1 and thus step-up charge is applied, step-up operation actually does not occur when the phase difference Δθ between the first phase shift amount θ1 and the second phase shift amount θ2 is equal to or smaller than the short-circuit prevention time td.

Figure 15:
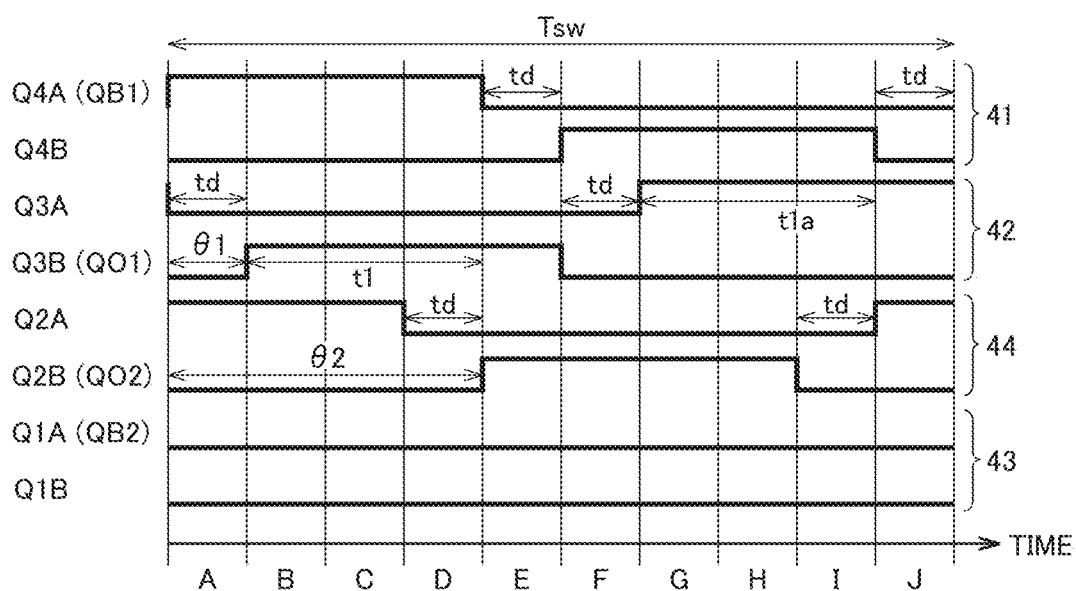
FIG. 15 is a time chart illustrating waveforms of on/off drive signals of switching elements when the phase difference between the first phase shift amount and the second phase shift amount is large in step-up charge by the DC/DC converter according to the first embodiment.

FIG. 15 is a time chart illustrating waveforms of on/off drive signals of the switching elements when the phase difference between the first phase shift amount θ1 and the second phase shift amount θ2 is greater than the short-circuit prevention time td.

FIG. 15 shows a gate pattern when the power transmission amount P1 is greater than that in FIG. 14, the first phase shift amount θ1 decreases from the reference phase shift amount θr (θr=Tsw×0.25) by Tsw×0.15, and conversely the second phase shift amount θ2 increases from the reference phase shift amount θr by Tsw×0.15. In other words, the first phase amount θ1 is 10% of the switching period Tsw and the second phase shift amount θ2 is 40% of the switching period Tsw. Thus, the phase difference between the first phase shift amount θ1 and the second phase shift amount θ2 is 30% of the switching period Tsw and three times the short-circuit prevention time td.

In period B in FIG. 15, first switching element Q4A on the positive electrode side (first reference element QB1) and second switching element Q3B on the negative electrode side (first diagonal element QO1) of first converter 10 are simultaneously on, and the diagonal two elements become electrically continuous. Thus, power is transmitted from DC power source PS1 to first reactor 14 to excite first reactor 14, in the same manner as described with reference to FIG. 8.

If the phase difference Δθ is large, fourth switching element Q2A on the positive electrode side of second converter 20 turns on in this period B. Therefore, current on a path including fourth switching element Q2A on the positive electrode side and antiparallel diode 51 of third switching element Q1A on the positive electrode side circulates to second reactor 24 to excite second reactor 24, in the same manner as described with reference to FIG. 5. Therefore, in period B, first reactor 14 and second reactor 24 are excited whereby step-up operation of second reactor 24 occurs.

Since the state in period C in FIG. 15 is the same as in period B, the excitation of first reactor 14 and second reactor 24 continues. In period D, since first converter 10 is in the same state as in periods B and C, the excitation of first reactor 14 continues.

On the other hand, in period D, since the short-circuit prevention time td applies in second converter 20, fourth switching element Q2A on the positive electrode side turns off. Thus, current flows toward battery PS2 through antiparallel diode 51 of third switching element Q1A on the positive electrode side and antiparallel diode 51 of fourth switching element Q2B on the negative electrode side, in the same manner as described with reference to FIG. 8.

As a result, in period D, excitation energy of first reactor 14 and second reactor 24 is transmitted toward battery PS2. Accordingly, in the gate pattern shown in FIG. 15, charge of battery PS2 actually involving step-up operation of second reactor 24, that is, step-up charge is performed.

In this way, the step-up operation of second reactor 24 is performed actually in a period obtained by subtracting the short-circuit prevention time td from the phase difference $\Delta\theta$ between the first phase shift amount $\theta1$ and the second phase shift amount $\theta2$. That is, in the gate pattern in FIG. 14, which is in the case of step-up charge in which the power transmission amount P1 is greater than first reference value Pr1, the phase difference $\Delta\theta$ between the first phase shift amount $\theta1$ and the second phase shift amount $\theta2$ does not increase to an extent exceeding the short-circuit prevention time td, and therefore actually step-up operation does not occur.

Considering such a relation between the phase difference $\Delta\theta$ and the short-circuit prevention time td, it is preferable that the phase shift amount control shown in FIG. 12 is modified in order to smoothly apply the switching frequency variable control so that unintended step-up operation does not occur at the time of step-down operation.

Specifically, the ON time Ton [s] of each switching element is represented by Ton=(Tsw−2·td)/2 using the switching period Tsw and the short-circuit prevention time td. Thus, the switching period Tsw is changed by the variable control of the switching frequency fsw. On the other hand, the first phase amount $\theta1$ and the second phase shift amount $\theta2$ are represented by the ratio to the switching period Tsw (Tsw=1/fsw). Thus, the time length corresponding to the phase difference $\Delta\theta$ also changes with the change of the switching frequency fsw.

For example, in the control of reducing the switching frequency, when the short-circuit prevention time td can be provided such that the proportion to the ON time of each switching element is constant, the first phase shift amount $\theta1$ and the second phase shift amount $\theta2$ can be set such that the phase difference $\Delta\theta$ with respect to the constant proportion is ensured between the first phase shift amount $\theta1$ and the second phase shift amount $\theta2$. More specifically, in the middle section in FIG. 12, in the region in which the output DUTY ratio is smaller than the first reference value Dr1 (in the region of P1<Prr1), a certain interval (phase difference $\Delta\theta$) corresponding to the constant proportion is provided in the graph of the first phase shift amount $\theta1$ and the second phase shift amount $\theta2$, thereby preventing occurrence of unintended step-up operation during step-down operation due to change of the switching frequency.

On the other hand, when the required length of short-circuit prevention time td is fixed according to the characteristics of each switching element (for example, IGBT) or the characteristics of the drive circuit for the switching element, it is difficult to set a constant phase difference $\Delta\theta$ between the first phase shift amount $\theta1$ and the second phase shift amount $\theta2$ to prevent step-up operation during step-down operation.

Figure 16:
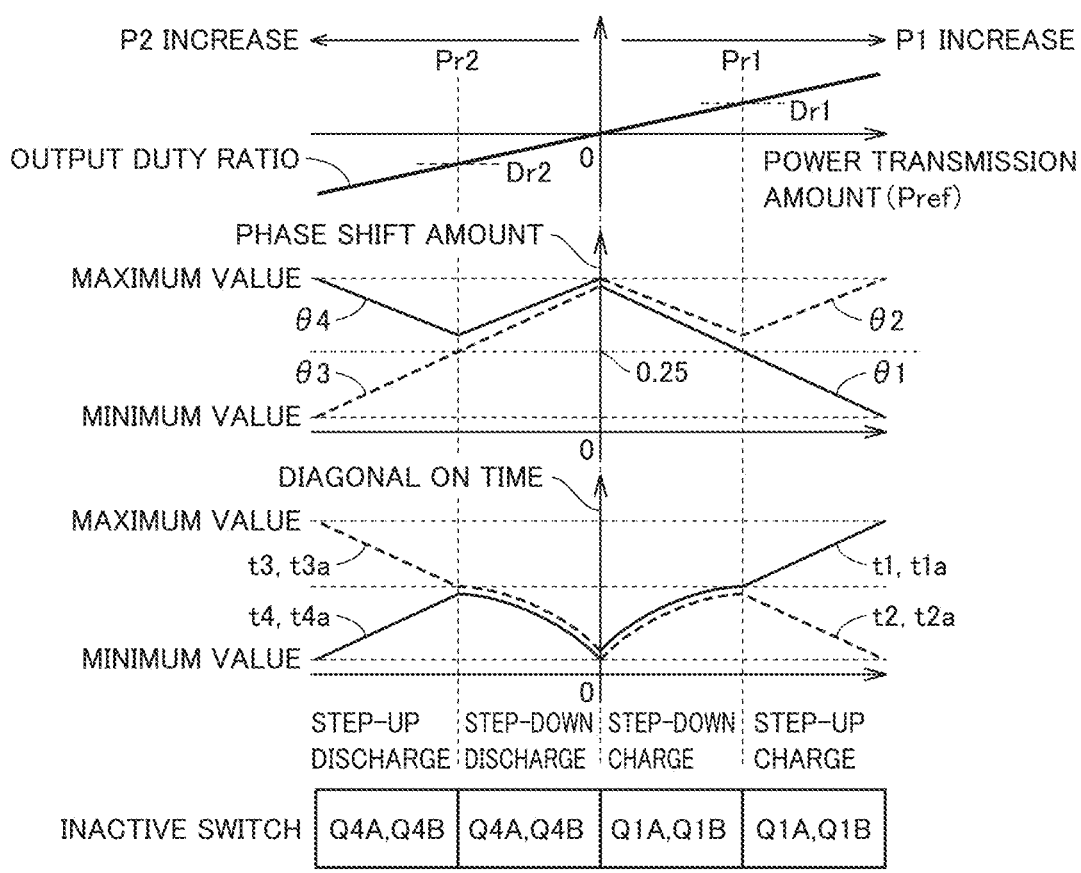
FIG. 16 is a graph for explaining a modification of the phase shift amount control in the DC/DC converter according to the first embodiment.

FIG. 16 shows a modification of the phase shift amount control in the DC/DC converter according to the first embodiment for handling such a case. FIG. 16 shows a graph having the horizontal axis and the vertical axis similar to those in FIG. 12.

Referring to FIG. 16, in the phase shift amount control according to the modification, the first phase shift amount $\theta1$ and the second phase shift amount $\theta2$ are set such that the time length of the phase difference $\Delta\theta$ is kept at the short-circuit prevention time td in the region in which the output DUTY ratio is smaller than the first reference value Dr1 (in the region of P1<Prr1) to handle the case in which the switching frequency fsw is variably set in accordance with FIG. 13(a).

Since the first phase amount $\theta1$ and the second phase shift amount $\theta2$ are represented by the ratio to the switching period Tsw (Tsw=1/fsw), the time length corresponding to the phase difference $\Delta\theta$ also changes in accordance with change of the switching frequency fsw. Specifically, as shown in the middle section in FIG. 16, the first phase shift amount $\theta1$ and the second phase shift amount $\theta2$ are set such that the phase difference $\Delta\theta32$ td/Tsw is ensured for the switching period Tsw that changes with the switching frequency fsw.

The first diagonal ON time t1, t1a and the second virtual diagonal ON time t2, t2a shown in the bottom section in FIG. 16 do not change linearly in accordance with change of the switching frequency fsw, unlike the bottom section in FIG. 12, in the region of P1<Prr1. On the other hand, a difference with a constant time length corresponding to the short-circuit prevention time td is ensured between the first diagonal ON time t1, t1a and the second virtual diagonal ON time t2, t2a. As a result, stable phase shift amount control adapted to the variable control of the switching frequency fsw can be implemented while the short-circuit prevention time td having a constant length is ensured.

(Control of Phase Shift Amount in Second Power Transmission)

The case of the second power transmission (discharge of battery PS2) will now be described. Since the circuit configuration of DC/DC converter 100 is symmetric with respect to transformer 3 as shown in FIG. 1, the control operation is symmetric between the first power transmission and the second power transmission as shown in FIG. 12.

As shown in the left half of the top graph in FIG. 12, in the case of the second power transmission, the output DUTY ratio increases in the negative direction as the power transmission amount P2 increases. In other words, the power transmission amount P2 and the output DUTY ratio are reverse in sign.

As shown in the left half of the middle graph in FIG. 12, control circuit 30 decreases the third phase shift amount $\theta3$ in accordance with increase of the power transmission amount P2 (that is, the output DUTY ratio increases in the negative direction) when the power transmission amount P2 is between 0 and the second reference value Pr2 preset to a value greater than 0, in other words, when the output DUTY ratio is between 0 and the second reference value Dr2 (Dr1<0). Furthermore, the fourth phase shift amount $\theta4$ is also decreased by the same amount as in the fourth phase shift amount $\theta41$, in accordance with increase of the power transmission amount P2.

When the power transmission amount P2 is the second reference value Pr2, the third phase shift amount $\theta3$ and the fourth phase shift amount $\theta4$ are set to the same amount. The phase shift amount in this case is equal to the reference phase shift amount $\theta r$ in the first power transmission. That is, in the present embodiment, the second reference value Pr2 is preset to the power transmission amount P2 (the output DUTY ratio having a value with the sign reversed) at which the third phase shift amount $\theta3$ and the fourth phase shift amount $\theta4$ are 25% of the switching period Tsw.

In the region of P2>Pr2, control circuit 30 decreases the third phase shift amount θ3 and increases the fourth phase shift amount θ4 as the power transmission amount P2 increases (the output DUTY ratio increases in the negative direction). In other words, in the entire region of Pref<0, the third phase shift amount θ3 continuously decreases with increase of the power transmission amount P2. Therefore, in the region of P2>Pr2, θ4>θ3, and the phase difference Δθ (Δθ=θ2−θ1) increases as the power transmission amount P2 (the absolute value of the output DUTY ratio) increases.

In the second power transmission, when the voltage at DC power source PS1 on the output side is higher than the voltage at battery PS2 on the input side, the second reference value Pr2 agrees with the switching point of the step-down discharge operation and the step-up discharge operation. This is because power transmission involving step-up is unable to be performed with the setting of the third phase shift amount θ3 and the fourth phase shift amount θ4 in P2<Pr2.

When the power transmission amount P2 is between 0 and the second reference value Pr2, control circuit 30 decreases the third phase shift amount θ3 from the maximum value (in the present example, 45% of the switching period Tsw) to 25% of the switching period Tsw at a constant second slope (absolute value) relative to the increase of the power transmission amount P2 (the increase of the output DUTY ratio in the negative direction).

When the power transmission amount P2 is between the second reference value Pr2 and twice (2·Pr2) the second reference value Pr2, control circuit 30 decreases the third phase shift amount θ3 from 25% of the switching period Tsw to the minimum value (in the present example, 5% of the switching period Tsw) at the same second slope (absolute value) as described above relative to the power transmission amount P2. At the same time, the fourth phase shift amount θ4 that is the same amount as the third phase shift amount θ3 in P2=Pr2 is increased from 25% of the switching period Tsw to the maximum value at the same second slope (absolute value) as described above relative to increase of the power transmission amount P2 (the increase of the output DUTY ratio in the negative direction). As a result, in the region in which the power transmission amount P2 is equal to or greater than the second reference value Pr2, the sum of the third phase shift amount θ3 and the fourth phase shift amount θ4 is constant.

The left half of the bottom graph in FIG. 12 shows change of the third diagonal ON time t3, t3a and the fourth virtual diagonal ON time t4, t4a, for such change of the third phase shift amount θ3 and the fourth phase shift amount θ4.

As described above, the third diagonal ON time t3, t3a is a value obtained by subtracting the third phase shift amount θ3 from the ON period of second reference element QB2. Similarly, the fourth virtual diagonal ON time t4, t4a is a value obtained by subtracting the fourth phase shift amount θ4 from the ON period of second reference element QB2. Therefore, in FIG. 12, the behavior of the third diagonal ON time t3, t3a and the fourth virtual diagonal ON time t4, t4a has an upside-down graph waveform of the behavior of the third phase shift amount θ3 and the fourth phase shift amount θ4.

In FIG. 12, both of the first phase shift amount θ1 at the time of charge and the fourth phase shift amount θ4 at the time of discharge correspond to the phase shift amount of first diagonal element QO1 (second switching element Q3B on the negative electrode side) and are depicted by similar solid lines.

Furthermore, both of the second phase shift amount θ2 at the time of charge and the third phase shift amount θ3 at the time of discharge correspond to the phase shift amount of second diagonal element QO2 (fourth switching element Q2B on the negative electrode side) and are depicted by similar dotted lines. Similarly, the first diagonal ON time t1 and the fourth virtual diagonal ON time t4 are depicted by similar solid lines, and the second virtual diagonal ON time t2 and the third diagonal ON time t3 are depicted by similar dotted lines.

Figure 17:
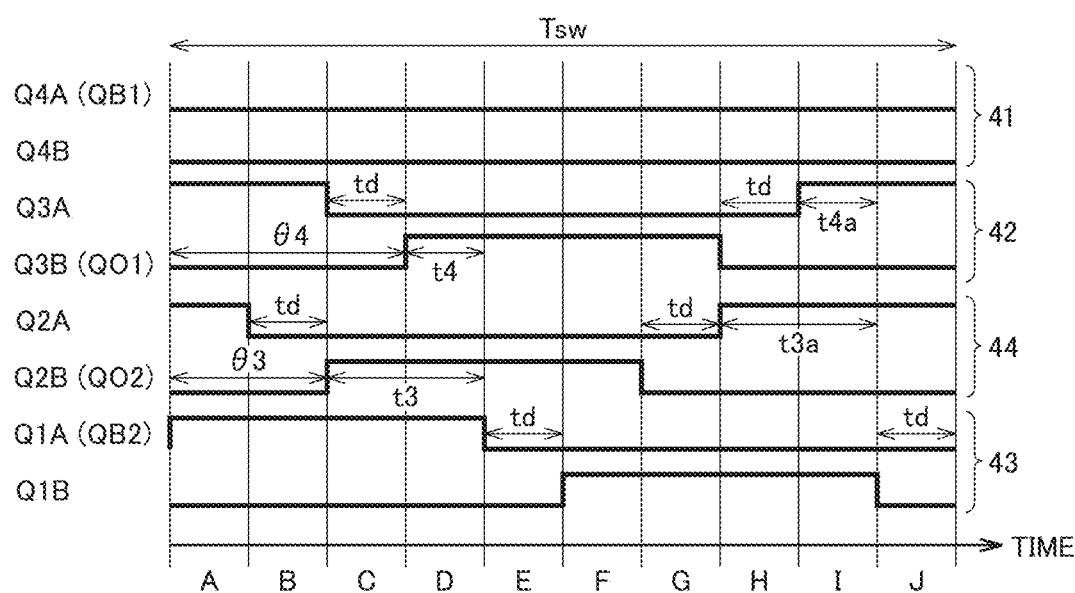
FIG. 17 is a time chart illustrating waveforms of on/off drive signals of switching elements when the phase difference between the first phase shift amount and the second phase shift amount is small in step-up discharge by the DC/DC converter according to the first embodiment.

FIG. 17 is a time chart, corresponding to FIG. 14 at the time of step-up charge, illustrating waveforms of on/off drive signals of the switching elements when the phase difference between the first phase shift amount and the second phase shift amount at the time of step-up discharge is small.

FIG. 17 shows a gate pattern when the third phase shift amount θ3 decreases from the reference phase shift amount θr (θr=Tsw×0.25) by Tsw×0.05 and conversely, the fourth phase shift amount θ4 increases from the reference phase shift amount θr by Tsw×0.05 in a region in which power transmission amount P2>Pr2 and step-up discharge is applied in the graph in FIG. 12. Specifically, the third phase amount θ3 is 20% of the switching period Tsw and the fourth phase shift amount θ4 is 30% of the switching period Tsw. Thus, the phase difference between the third phase shift amount θ3 and the fourth phase shift amount θ4 is 10% of the switching period Tsw and equal to the short-circuit prevention time td.

Referring to FIG. 17, in the discharge operation, conversely to the charge operation, second converter 20 is the power-transmitting side and first converter 10 is the power-receiving side. Therefore, third switching elements Q1A and Q1B of second converter 20 are turned on/off in the same manner as first switching elements Q4A and Q4B of first converter 10 in FIG. 14 (step-up charge). Similarly, fourth switching elements Q2A and Q2B of second converter 20 are turned on/off in the same manner as second switching elements Q3A and Q3B of first converter 10 in FIG. 14 (step-up charge). Furthermore, in first converter 10 on the power-receiving side, first switching elements Q4A and Q4B of first bridge circuit 41 are kept in the off state.

The circuit operation in the gate pattern in FIG. 17 is similar to the circuit operation in the gate pattern in FIG. 14 and has the power transmission direction reversed. That is, FIG. 17 shows a gate pattern in step-up discharge in which the power transmission amount P2 is greater than the second reference value Pr2. However, since the phase difference Δθ between the third phase shift amount θ3 and the fourth phase shift amount θ4 is equal to or smaller than the short-circuit prevention time td, step-up operation of first reactor 14 actually does not occur.

Figure 18:
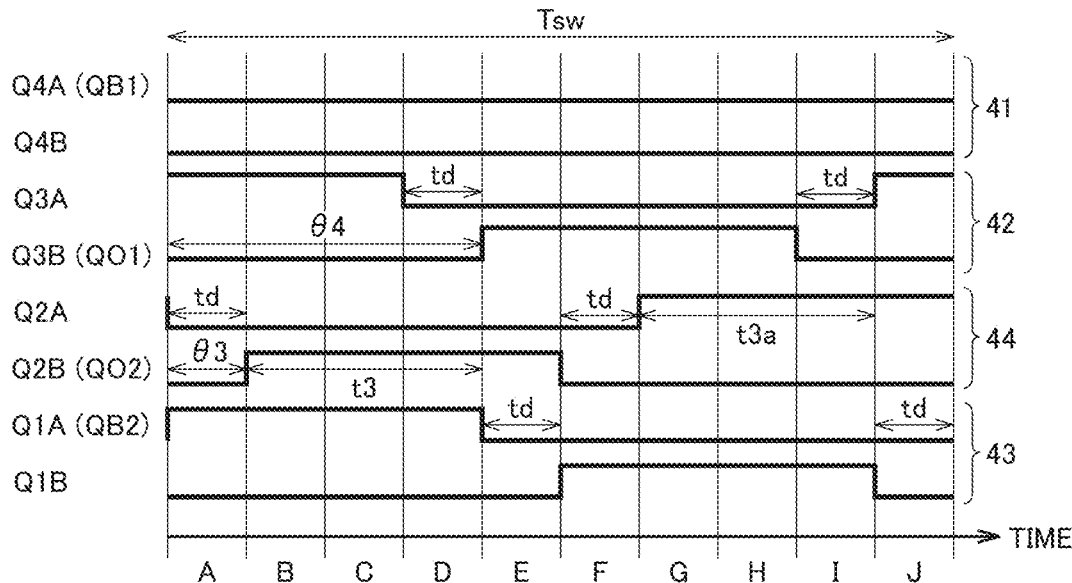
FIG. 18 is a time chart illustrating waveforms of on/off drive signals of switching elements when the phase difference between the first phase shift amount and the second phase shift amount is large in step-up discharge by the DC/DC converter according to the first embodiment.

FIG. 18 is a time chart, corresponding to FIG. 15 at the time of step-up charge, illustrating waveforms of on/off drive signals of the switching elements when the phase difference between the first phase shift amount and the second phase shift amount at the time of step-up discharge is large.

FIG. 18 shows a gate pattern when the power transmission amount P2 is greater than that in FIG. 17, the second phase shift amount θ2 decreases from the reference phase shift amount θr (θr=Tsw×0.25) by Tsw×0.15, and conversely the fourth phase shift amount θ4 increases from the reference phase shift amount θr by Tsw×0.15. Specifically, the third phase amount θ3 is 10% of the switching period Tsw and the fourth phase shift amount θ4 is 40% of the switching period Tsw. Thus, the phase difference between the third phase shift amount θ3 and the fourth phase shift amount θ4 is 30% of the switching period Tsw and three times the short-circuit prevention time td.

In FIG. 18, compared with FIG. 15, the on/off drive signals of first switching elements Q4A and Q4B and the on/off drive signals of third switching elements Q1A and Q1B are interchanged. Furthermore, the on/off drive signals of second switching elements Q3A and Q3B and the on/off drive signals of fourth switching elements Q2A and Q2B are interchanged. Furthermore, in first converter 10 on the power-receiving side, first switching elements Q4A and Q4B of first bridge circuit 41 are kept in the off state.

Therefore, the circuit operation in the gate pattern in FIG. 18 is similar to the circuit operation in the gate pattern in FIG. 15 and has the power transmission direction reversed. That is, in FIG. 18, the phase difference Δθ between the third phase shift amount θ3 and the fourth phase shift amount θ increases to an extent exceeding the short-circuit prevention time td, and step-up operation of first reactor 14 occurs.

In this way, in step-up discharge, the step-up operation of first reactor 14 is actually performed in a period obtained by subtracting the short-circuit prevention time td from the phase difference Δθ between the third phase shift amount θ3 and the fourth phase shift amount θ4.

In this way, because of the symmetry in circuit configuration of DC/DC converter 100, the circuit operation of the second power transmission is the same as the first power transmission except that the directions of power transmission are opposite. Therefore, the phase shift amount control and the control of the switching frequency can be equivalent to those in the first power transmission.

Referring to FIG. 13 again, since the output DUTY ratio is negative when the power transmission amount P2>0, the left half region corresponds to the second power transmission. Therefore, in FIG. 13(a), the switching frequency fsw of first converter 10 and second converter 20 is lowered, compared with f1 in the region in which the power transmission amount P2 is smaller than the second reference value Pr2, that is, in the region of Dr2<output DUTY ratio<0 (P2<Pr2). For example, the switching frequency fsw against the output DUTY ratio (power transmission amount P2) in the second power transmission can be set in accordance with a graph in which the setting graph of the switching frequency fsw against the power transmission amount P1 or the output DUTY ratio in the first power transmission is folded symmetrically with respect to the vertical axis (y axis). In this way, it is preferable that the switching frequency fsw against the magnitude of power transmission is set similarly between the first and second power transmissions.

Furthermore, it is preferable that the phase difference Δθ between the third phase shift amount θ3 and the fourth phase shift amount θ4 in the second power transmission is also set such that a constant proportion to the ON time of each switching element or the short-circuit prevention time td having a constant length is ensured, as described in conjunction with FIG. 16. In other words, the third phase shift amount θ3 and the fourth phase shift amount θ4 relative to the power transmission amount P2 can be set in the same manner as the setting of the first phase shift amount θ1 and the second phase shift amount θ2 relative to the power transmission amount P1 described above.

In this way, in the DC/DC converter 100 according to the first embodiment, the variable control of reducing the switching frequency is applied in the region in which the power transmission amount is small with a margin in the VT product of transformer 3 (corresponding to the step-down operation region under a certain condition). This leads to reduction of switching loss and thus improvement of power conversion efficiency. In particular, in each bidirectional power transmission, the power transmission amount is easily controlled by adjusting the phase shift amount and power loss is reduced by variable control of the switching frequency.

Second Embodiment

A DC/DC converter according to a second embodiment will now be described. The DC/DC converter according to the second embodiment is similar to that of the first embodiment in circuit configuration and basic control but differs from the first embodiment in control of the phase shift amount based on the power transmission amount. In the second embodiment, a description of parts similar to those in the first embodiment is basically not repeated.

Figure 19:
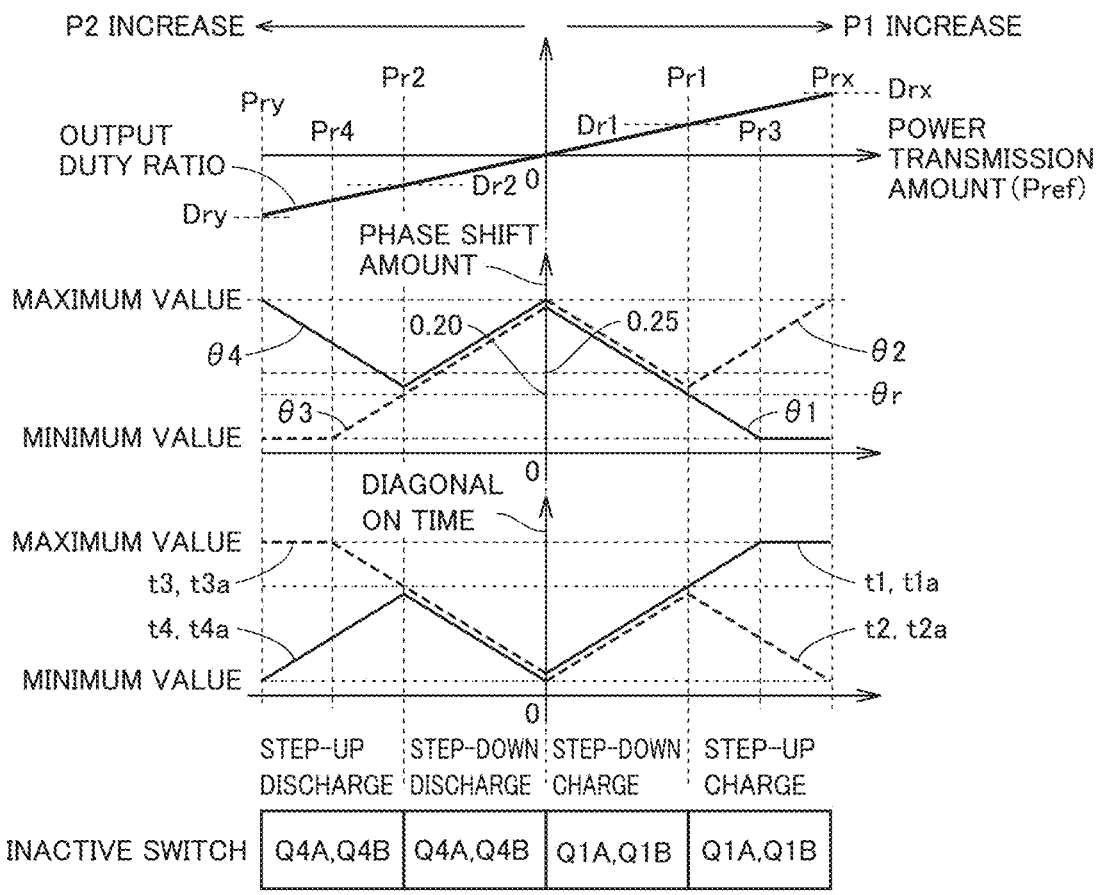
FIG. 19 is a graph for explaining control of the phase shift amount based on the power transmission amount in a DC/DC converter according to a second embodiment.

FIG. 19 is a graph for explaining control of the phase shift amount based on the power transmission amount in the DC/DC converter according to the second embodiment.

Referring to FIG. 19, the top graph is the same as that of FIG. 12, whereas the middle graph differs from that of FIG. 12.

First, the case of the first power transmission (charge of battery PS2) will be described in detail. As shown in the right half of the middle graph in FIG. 19, control circuit 30 decreases the first phase shift amount θ1 as the power transmission amount P1 (output DUTY ratio) increases when the power transmission amount P1 is in the range of 0 to the first reference value Pr1 (Pr1>0), in other words, when the output DUTY ratio is in the range of 0 to the first reference value Dr1 (Dr1>0). Furthermore, the second phase shift amount θ2 is also decreased by the same amount as in the first phase shift amount θ1, in accordance with the output DUTY ratio.

When the power transmission amount P1 (output DUTY ratio) is between the first reference value Pr1 and the third reference value Pr3 (Pr3>Pr1), control circuit 30 decreases the first phase shift amount θ1 and increases the second phase shift amount θ2, with respect to the first phase shift amount θ1 and the second phase shift amount θ2 (reference phase shift amount θr) where P1=Pr1, in accordance with increase of the power transmission amount P1 (output DUTY ratio).

When the power transmission amount P1 (output DUTY ratio) is greater than the third reference value Pr3, control circuit 30 fixes the first phase shift amount θ1 to the minimum value and continuously increases the second phase shift amount θ4 up to the maximum value while keeping the same slope relative to increase of the power transmission amount P1. When the output DUTY ratio reaches the reference value Drx, the second phase shift amount θ2 reaches the maximum value. Therefore, in the region of the output DUTY ratio>Drx (that is, P1>Prx), both of the first phase shift amount θ1 and the second phase shift amount θ2 are constant.

Even in the DC/DC converter according to the second embodiment, the range in which the power transmission amount P1 is from 0 to the first reference value Pr1 is the section in which step-down charge is performed, and the range in which the power transmission amount P1 is greater than the first reference value Pr1 is the section in which step-up charge is performed, under a condition that the voltage on the output side (voltage at battery PS2) is higher than the voltage on the input side (voltage at DC power source PS1), in the same manner as the first embodiment.

In the second embodiment, the reference phase shift amount θr corresponding to the first phase shift amount θ1 when P1=Pr1 is preset to a value smaller than that in the first embodiment (for example, 20% of the switching period Tsw). Furthermore, the third reference value Pr3 is preset to an equivalent to the power transmission amount P1 (output DUTY ratio) when the first phase shift amount θ1 is 5% of the switching period Tsw.

As shown in the right half of the bottom graph in FIG. 19, the first diagonal ON time t1, t1a and the second virtual diagonal ON time t2, t2a have an upside-down shape of the first phase shift amount θ1 and the second phase shift amount θ2.

The case of the second power transmission (discharge of battery PS2) will now be described in detail. As shown in the left half of the middle graph in FIG. 19, control circuit 30 decreases the third phase shift amount θ3 in accordance with increase of the power transmission amount P2 (increase of the output DUTY ratio in the negative direction) when the power transmission amount P2 is between 0 and the second reference value Pr2 (Pr2>0), in other words, when the output DUTY ratio is between 0 and the second reference value Dr2 (Dr2<0). Furthermore, control circuit 30 sets the fourth phase shift amount θ4 such that it is changed by the same amount as in the third phase shift amount θ3.

When the power transmission amount P2 is between the second reference value Pr2 and the fourth reference value Pr4 (Pr4<Pr2), control circuit 30 decreases the third phase shift amount θ3 and increases the fourth phase shift amount θ4, with respect to the third phase shift amount θ3 and the fourth phase shift amount θ4 where P2=Pr2, in accordance with increase of the power transmission amount P2 (increase of the output DUTY ratio in the negative direction).

When the power transmission amount P2 is greater than the fourth reference value Pr4, control circuit 30 fixes the third phase shift amount θ3 to the minimum value and continuously increases the fourth phase shift amount θ4 up to the maximum value while keeping the same slope relative to increase of the power transmission amount P2. When the output DUTY ratio reaches the reference value Dry, the fourth phase shift amount θ4 reaches the maximum value. Therefore, in the region of the output DUTY ratio<Dry (that is, P2>Pry), both of the third phase shift amount θ3 and the fourth phase shift amount θ4 are constant.

Even in the DC/DC converter according to the second embodiment, the range in which the power transmission amount P2 is from 0 to the second reference value Pr2 is the range in which step-down discharge is performed, and the range in which the power transmission amount P2 is greater than the second reference value Pr2 is the range in which step-up discharge is performed, under a condition that the voltage on the output side (voltage at DC power source PS1) is higher than the voltage on the input side (voltage at battery PS2), in the same manner as the first embodiment.

In the second embodiment, the reference phase shift amount θr corresponding to the third phase shift amount θ3 when P2=Pr2 is preset to a value common to charge operation. As described above, the reference phase shift amount θr is preset to a value smaller than that in the first embodiment (for example, 20% of the switching period Tsw). Furthermore, the fourth reference value Pr4 is preset to an equivalent to the power transmission amount P2 (output DUTY ratio) when the first phase shift amount θ3 is 5% of the switching period Tsw.

As shown in the left half of the bottom graph in FIG. 19, the third diagonal ON time t3, t3a and the fourth virtual diagonal ON time t4, t4a have an upside-down shape of the third phase shift amount θ3 and the fourth phase shift amount θ4.

Even in the second embodiment, in the step-down operation region, that is, in the region of 0<P1<Pr1 and the region of 0<P2<Pr2, the phase difference between the first phase shift amount θ1 and the second phase shift amount θ2 and the phase difference between the third phase shift amount θ3 and the fourth phase shift amount θ4 can be set such that a constant proportion to the ON time of each switching element or the short-circuit prevention time td having a constant length is ensured as described in conjunction with FIG. 16 in the first embodiment.

Figure 20:
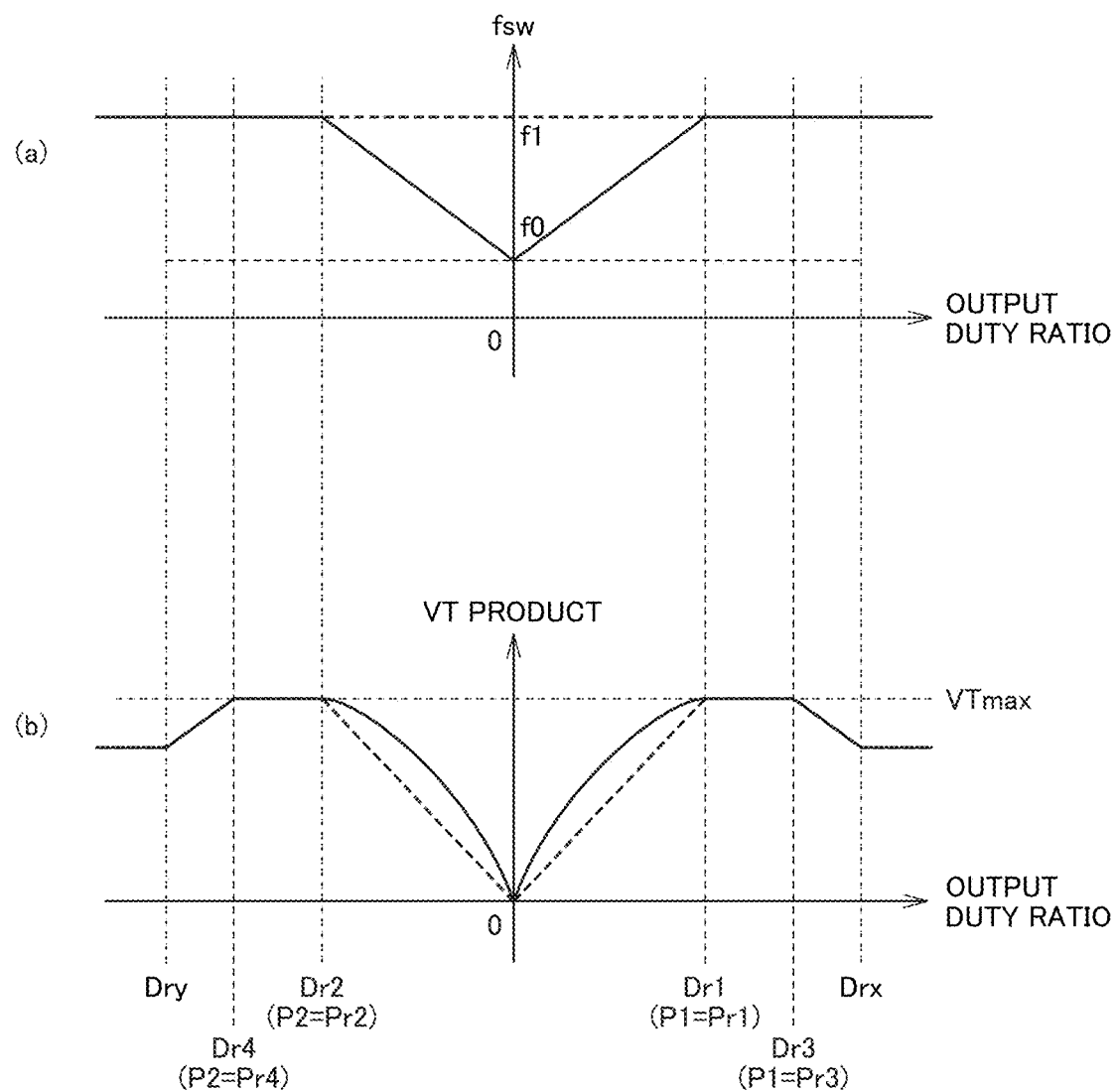
FIG. 20 is a graph for explaining control of switching frequency based on a power transmission amount in the DC/DC converter according to the second embodiment.

Referring now to FIG. 20, the switching frequency control for the DC/DC converter according to the second embodiment will be described.

In FIG. 20, the upper section (a) shows control of the switching frequency fsw against the output DUTY ratio, and the lower section (b) shows change of the VT product (the product of voltage and time) of applied voltage to first winding 3a and second winding 3b of transformer 3 against the output DUTY ratio, in the same manner as in FIG. 13.

In FIG. 20, a comparative example similar to FIG. 13, that is, the characteristic in the case where fsw=f1 is fixed is also shown by a dotted line, as shown in FIG. 20(a). As shown by the dotted line in FIG. 20(b), in the region in which the output DUTY ratio is 0 to Dr1 or 0 to Dr2 (Dr2<0), the first diagonal ON time and the second virtual diagonal ON time increase in accordance with increase of the output DUTY ratio in the positive direction or the negative direction. The VT product of transformer 3 also increases correspondingly.

On the other hand, in the region in which the output DUTY ratio is Dr1 to Dr3 or Dr2 to Dr4 (Dr4<0), the sum of the first diagonal ON time and the second virtual diagonal ON time is constant relative to increase of the output DUTY ratio in the positive direction or the negative direction. In this period, the VT product of transformer 3 also has a constant value.

In the region of the output DUTY ratio>Dr3 or the output duty ratio<Dr4, the sum of the first diagonal ON time and the second virtual diagonal ON time also decreases, compared with when the output DUTY ratio is Dr2 or Dr4, in accordance with increase of the output DUTY ratio in the positive direction or the negative direction. As a result, the VT product of transformer 3 also increases relative to increase of the output DUTY ratio in the positive direction or the negative direction. Then, in FIG. 19, in the region outside of the reference value Drx that is the output DUTY ratio when the second phase shift amount θ2 reaches the maximum value and in the region outside of the reference value Dry that is the output DUTY ratio when the fourth phase shift amount θ4 reaches the maximum value, the sum of the first diagonal ON time and the second virtual diagonal ON time is constant, and the VT product also has a constant value.

In this way, the VT product of transformer 3 is the maximum value VTmax in the range in which the output DUTY ratio is Dr1 to Dr3 or in the range of Dr2 to Dr4. The switching frequency f1 is determined such that the maximum value VTmax does not exceed the permissible maximum value (rated value) of transformer 3, in the same manner as in the first embodiment.

Based on this, FIG. 20(b) suggests that, in the region in which the output DUTY ratio is between 0 and the reference value Drx (P1<Prx) and the region in which the output DUTY ratio is between 0 and the reference value Dry (P2<Pry), the VT product of transformer 3 has a margin for the switching frequency fsw=f1, also in the second embodiment.

In DC/DC converter 100 according to the second embodiment, therefore, in the region of P1<Prx and the region of P2<Pry, the switching frequency fsw is also lowered, compared with the switching frequency (fsw=f1) in the region of P1≥Prx and the region of P2≥Pry, as shown in FIG. 20(*a*).

For example, as shown in FIG. 20(*a*), in the range in which the output DUTY ratio is 0 to Dr1 and the range of 0 to Dr2, the switching frequency fsw is controlled such that the switching frequency fsw changes from f0 to f1 as a linear function of the output DUTY ratio (absolute value).

The DC/DC converter according to the second embodiment is suitable for power transmission in a low output range, because the range of step-down charge or step-down discharge (the range of the power transmission amount P1, P2 or the output DUTY ratio) is expanded, compared with the first embodiment. In the DC/DC converter according to the second embodiment, therefore, the effect of improving the power conversion efficiency by reduction of switching loss can be expected to be enhanced in combination with the control of the switching frequency fsw similar to that in the first embodiment.

In the first and second embodiments, in FIG. 12, FIG. 16, and FIG. 19, a simple example in which the output DUTY ratio is set in a proportional relation to the command values of the power transmission amounts P1 and P2 has been described. However, the output DUTY ratio may be calculated by feedback control of the detected values of current and voltage in the same manner as in PTL 1.

Figure 21:
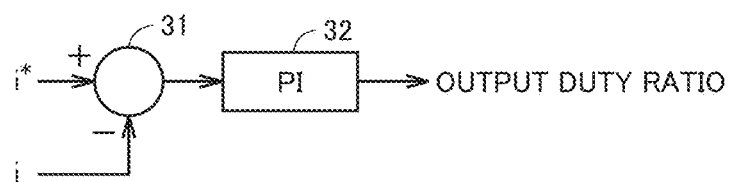
FIG. 21 is a block diagram for explaining a first modification of calculation of an output DUTY ratio by a control circuit.

FIG. 21 is a block diagram for explaining a first modification of calculation of the output DUTY ratio by control circuit 30.

Referring to FIG. 21, control circuit 30 includes a subtractor 31 and a control calculator 32. Subtractor 31 subtracts a current detection value i of battery PS2 from a current command value i* of battery PS2 to calculate a current deviation Δi. Current command value i* can be set based on the power transmission amount P1 or P2 between first DC power source PS1 and second DC power source PS2. Current command value i* is set to a negative value (i*<0) at the time of charge of battery PS2 (first power transmission) and is set to a positive value (i*>0) at the time of discharge (second power transmission).

Control calculator 32 calculates an output DUTY ratio by proportional integral (PI) control calculation of current deviation Δi. By doing so, feedback control to change the output DUTY ratio can be performed such that charge/discharge current (current i) approaches the current command value i* in charge (first power transmission) or discharge (second power transmission) of battery PS2.

Figure 22:
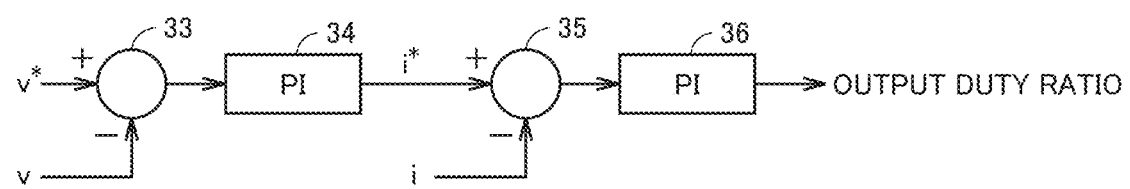
FIG. 22 is a block diagram for explaining a second modification of calculation of the output DUTY ratio by the control circuit.

FIG. 22 is a block diagram for explaining a second modification of calculation of the output DUTY ratio by control circuit 30.

Referring to FIG. 22, control circuit 30 includes subtractors 33 and 35 and control calculators 34 and 36. Subtractor 33 subtracts a voltage detection value v of DC power source PS1 from a voltage command value v* of DC power source PS1 to calculate a voltage deviation Δv. The voltage command value v* can be set based on the power transmission amount P1 or P2.

Control calculator 34 calculates a current command value i* of battery PS2 by proportional integral (PI) control calculation of the voltage deviation Δv. Furthermore, subtractor 35 subtracts the current detection value i of battery PS2 from the current command value i* from control calculator 34 to calculate a current deviation Δi. Control calculator 36 calculates an output DUTY ratio by proportional integral (PI) control calculation of the current deviation Δi.

Thus, feedback control to change the output DUTY ratio can be performed such that the output voltage v of DC power source PS1 approaches the voltage command value v* set based on the power transmission amounts P1 and P2. Alternatively, the output DUTY ratio may be directly calculated by proportional integral (PI) control calculation for the voltage deviation Δv.

In the present embodiment, the output DUTY ratio as an intermediate variable can be calculated by any calculation formula as long as the object of controlling the power transmission amount by the first power transmission or the second power transmission is met.

Third Embodiment

In a third embodiment, a configuration example of a power conversion device including a plurality of DC/DC converters in the first embodiment or the second embodiment will be described.

Figure 23:
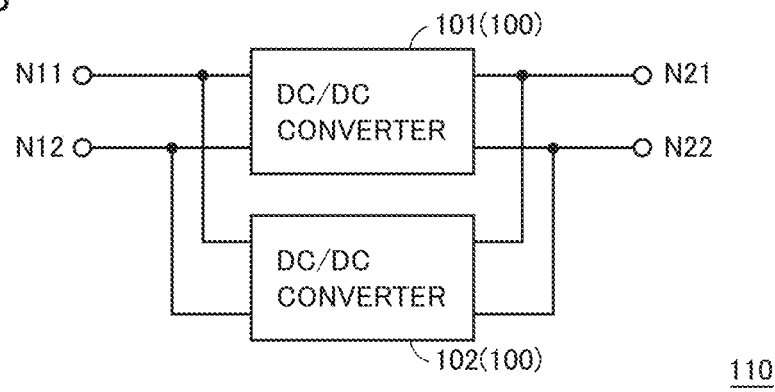
FIG. 23 is a block diagram for explaining a first configuration example of a power conversion device according to a third embodiment.

FIG. 23 is a block diagram illustrating a first configuration example of the power conversion device according to the third embodiment.

Referring to FIG. 23, a power conversion device 110 according to the first example of the third embodiment includes DC/DC converters 101 and 102 connected in parallel. In the third embodiment, each of DC/DC converters 101 and 102 is configured with DC/DC converter 100 according to the first or second embodiment.

In power conversion device 110, in DC/DC converters 101 and 102 connected in parallel, first positive electrode wires 11 (FIG. 1) are connected in common to a power supply terminal N11, and first negative electrode wires 12 (FIG. 1) are connected in common to a power supply terminal N12. Power supply terminal N11 is electrically connected to the positive electrode of first DC power source PS1, and power supply terminal N12 is electrically connected to the negative electrode of first DC power source PS1.

Similarly, in DC/DC converters 101 and 102 connected in parallel, second positive electrode wires 21 (FIG. 1) are connected in common to a power supply terminal N21, and second negative electrode wires 22 (FIG. 1) are connected in common to a power supply terminal N22. Power supply terminal N21 is electrically connected to the positive electrode of second DC power source PS2, and power supply terminal N22 is electrically connected to the negative electrode of first DC power source PS2.

In power conversion device 110 in the first configuration example, power can be transmitted bidirectionally between first DC power source PS1 and second DC power source PS2 using DC/DC converters 101 and 102 (100) connected in parallel. This configuration facilitates application to large power transmission.

Figure 24:
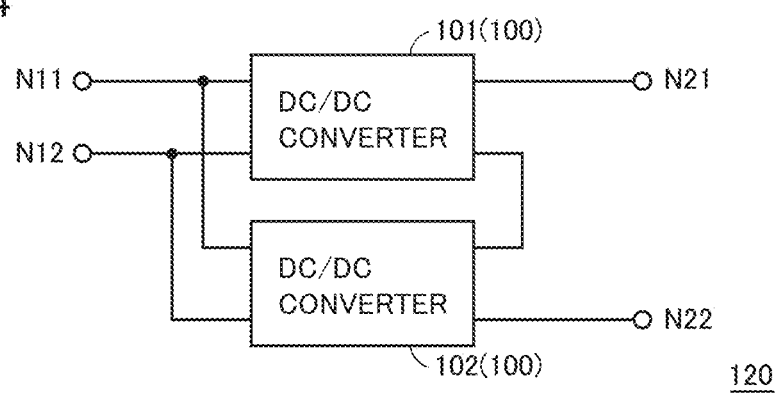
FIG. 24 is a block diagram for explaining a second configuration example of the power conversion device according to the third embodiment.

FIG. 24 is a block diagram illustrating a second configuration example of the power conversion device according to the third embodiment.

Referring to FIG. 24, a power conversion device 120 according to the second example of the third embodiment includes DC/DC converters 101 and 102 connected in series parallel. Power supply terminal N21 is electrically connected to the positive electrode of second DC power source PS2, and power supply terminal N22 is electrically connected to the negative electrode of first DC power source PS2.

First positive electrode wires 11 (FIG. 1) of DC/DC converters 101 and 102 are connected in common to power supply terminal N11, and first negative electrode wires 12 (FIG. 1) are connected in common to power supply terminal N12. That is, DC/DC converters 101 and 102 are connected in parallel on the first DC power source side.

On the other hand, second positive electrode wire 21 of DC/DC converter 101 is connected to power supply terminal N21 electrically connected to the positive electrode of second DC power source PS2. Second negative electrode wire 22 of DC/DC converter 102 is connected to power supply terminal N22 electrically connected to the positive electrode of second DC power source PS2. Furthermore, second positive electrode wire 21 of DC/DC converter 102 is connected to second negative electrode wire 22 of DC/DC converter 102. That is, DC/DC converters 101 and 102 are connected in series on the second DC power source side.

In power conversion device 110 in the second configuration example, power can be transmitted bidirectionally between first DC power source PS1 and second DC power source PS2 using DC/DC converters 101 and 102 (100) connected in series parallel. This configuration facilitates application to power transmission between DC power sources with different voltages. In the configuration in FIG. 28, the connections may be replaced with each other such that the first DC power source sides are connected in series and the second DC power source sides are connected in parallel.

Figure 25:
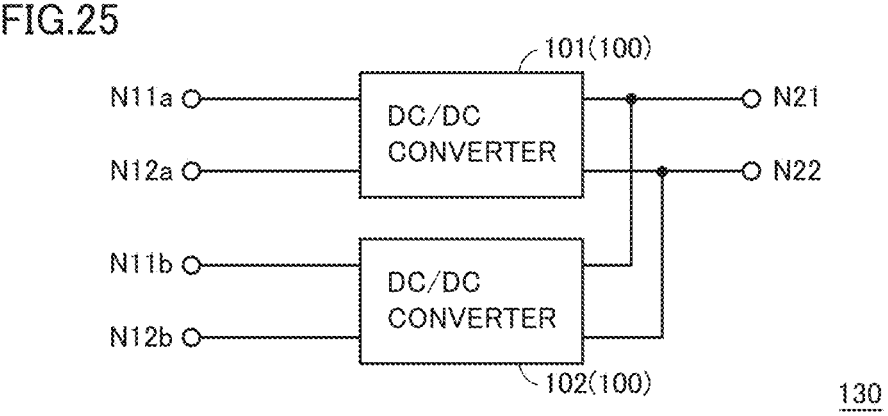
FIG. 25 is a block diagram for explaining a third configuration example of the power conversion device according to the third embodiment.

FIG. 25 is a block diagram illustrating a third configuration example of the power conversion device according to the third embodiment.

Referring to FIG. 25, a power conversion device 130 according to the third example of the third embodiment includes DC/DC converters 101 and 102.

In power conversion device 130, in DC/DC converter 101, first positive electrode wire 11 (FIG. 1) is connected to a power supply terminal N11a, and first negative electrode wire 12 (FIG. 1) is connected to a power supply terminal N12a. In DC/DC converter 101, first positive electrode wire 11 (FIG. 1) is connected to a power supply terminal N11b, and first negative electrode wire 12 (FIG. 1) is connected to a power supply terminal N12b. Separate first DC power sources PS1 are connected to power supply terminals N11a and N11b and to power supply terminals N12a and N12b.

On the other hand, second positive electrode wires 21 (FIG. 1) of DC/DC converters 101 and 102 are connected to power supply terminal N21 electrically connected to the positive electrode of second DC power source PS2. Similarly, second negative electrode wires 22 (FIG. 1) of DC/DC converters 101 and 102 are connected to power supply terminal N22 electrically connected to the negative electrode of second DC power source PS2.

In power conversion device 110 in the third configuration example, power can be transmitted bidirectionally between first DC power sources PS1 and second DC power source PS2 which are different in number. In the configuration of FIG. 29, the respective numbers of first DC power sources PS1 and second DC power sources PS2 between which power transmission is performed can be set as desired.

In the third embodiment, control circuit 30 of DC/DC converters 101 and 102 may be configured in common using one controller, or separate controllers may be arranged individually for DC/DC converters 100 and communication may be performed between the controllers to perform drive control.

In the power conversion device according to the third embodiment, a plurality of DC/DC converters 100 according to the first or second embodiment are arranged and connected in parallel or in series to one or more first DC power source(s) PS1 and second DC power source(s) PS2. In each DC/DC converter 100, the control of the switching frequency described in the first or second embodiment is individually performed, thereby reducing the switching loss and thus improving the power conversion efficiency. In particular, by taking advantage of improvement in power conversion efficiency in a region with a small power transmission amount in DC/DC converter 100, steady power conversion efficiency can be improved in power conversion devices 110 to 130 as a whole by applying control such as adjusting burden of the power transmission amount among a plurality of DC/DC converters 100 or stopping power transmission operation in some of DC/DC converters 100 as appropriate.

Other Embodiments

Finally, other embodiments of the present disclosure will be described. The configurations of the embodiments described below are not necessarily applied singly and may be applied in combination with a configuration of another embodiment as long as there is no discrepancy.

(1) In the foregoing embodiments, first switching element Q4A on the positive electrode side of first bridge circuit 41 is defined as "first reference element QB1", second switching element Q3B on the negative electrode side of second bridge circuit 42 is defined as "first diagonal element QO1", third switching element Q1A on the positive electrode side of third bridge circuit 43 is defined as "second reference element QB2", and fourth switching element Q2B on the negative electrode side of fourth bridge circuit 44 is defined as "second diagonal element QO2", as a typical example.

However, the embodiments of the present disclosure are not limited thereto. For example, first switching element Q4B on the negative electrode side of first bridge circuit 41 may be defined as "first reference element QB1", second switching element Q3A on the positive electrode side of second bridge circuit 42 may be defined as "first diagonal element QO1", third switching element Q1B on the negative electrode side of third bridge circuit 43 may be defined as "second reference element QB2", and fourth switching element Q2A on the positive electrode side of fourth bridge circuit 44 may be defined as "second diagonal element QO2".

(2) In the foregoing embodiments, in first converter 10 in FIG. 1, the bridge circuit on the left side is first bridge circuit 41 in which first reference element QB1 is set, and the bridge circuit on the right side is second bridge circuit 42 in which first diagonal element QO1 is set, and in second converter 20 in FIG. 1, the bridge circuit on the right side is third bridge circuit 43 in which second reference element QB2 is set, and the bridge circuit on the left side is fourth bridge circuit 44 in which second diagonal element QO2 is set, as a typical example.

However, the embodiments of the present disclosure are not limited thereto. For example, in first converter 10 in FIG. 1, the bridge circuit on the right side may be first bridge circuit 41 in which first reference element QB1 is set, and the bridge circuit on the left side may be second bridge circuit 42 in which first diagonal element QO1 is set, and in second converter 20 in FIG. 1, the bridge circuit on the left side may be third bridge circuit 43 in which second reference element QB2 is set, and the bridge circuit on the right side may be fourth bridge circuit 44 in which second diagonal element QO2 is set.

(3) In the foregoing embodiments, second DC power source PS2 is a battery, by way of example. However, the embodiments of the present disclosure are not limited thereto. That is, each of first DC power source PS1 and second DC power source PS2 may be configured with any DC power source. The DC power source may be configured with a battery as described above, or a power storage element such as a large-capacity capacitor, a power supply device that converts AC power from an AC power source such as a commercial system into DC power, a rotating machine (DC motor) having the functions of a power generator and an electric motor in combination, or a unit having the rotating machine (AC motor) and an inverter (AC/DC converter) in combination.

(4) In the foregoing embodiments, in the diagrams such as FIG. 2 illustrating the temporal waveforms of drive signals of the switching elements, the switching period Tsw is divided into ten periods, namely, periods A to J, and a gate pattern that is a combination pattern of the on or off drive signals of the switching elements is set in each of periods A to J, by way of example. The short-circuit prevention time td is equivalent to one period that is each of ten equal parts of the switching period, as a typical example.

However, the embodiments of the present disclosure are not limited thereto, and the switching period Tsw may be divided into any number of parts. Alternatively, the switching period Tsw is not necessarily divided into a plurality of periods, and the phase shift amounts $\theta 1$ to $\theta 4$ may be continuously changed. The short-circuit prevention time td can be set to any time length in a range that can avoid a simultaneous on state of the positive electrode-side switching elements and the negative electrode-side switching elements.

(5) In the first embodiment, the first reference value Pr1 is preset to correspond to the power transmission amount P1 when the first phase shift amount $\theta 1$ and the second phase shift amount $\theta 2$ are 25% of the switching period Tsw, and the second reference value Pr2 is preset to correspond to the power transmission amount P2 when the third phase shift amount $\theta 3$ and the fourth phase shift amount $\theta 4$ are 25% of the switching period Tsw, by way of example.

In the second embodiment, the first reference value Pr1 is preset to correspond to the power transmission amount P1 when the first phase shift amount $\theta 1$ and the second phase shift amount $\theta 2$ are a preset value smaller than 25% of the switching period Tsw, and the second reference value Pr2 is preset to correspond to the power transmission amount P2 when the third phase shift amount $\theta 3$ and the fourth phase shift amount $\theta 4$ are a preset value smaller than 25% of the switching period Tsw, as a typical example. However, the embodiments of the present disclosure are not limited thereto. That is, the first reference value Pr1 can be set to correspond to the power transmission amount P1 when the first phase shift amount $\theta 1$ and the second phase shift amount $\theta 2$ are any predetermined $\alpha$% from 0% to 50% of the switching period Tsw. Similarly, the second reference value Pr2 can be set to correspond to the power transmission amount P2 when the third phase shift amount $\theta 3$ and the fourth phase shift amount $\theta 4$ are any predetermined $\beta$% from 0% to 50% of the switching period Tsw. Furthermore, for the first reference value Pr1 and the second reference value Pr2, $\alpha$ and $\beta$ may be the same value or may be different values.

(6) In the foregoing embodiments, the first to fourth phase shift amounts $\theta 1$ to $\theta 4$ increase or decrease at the same slope, with respect to increase or decrease of the power transmission amount (output DUTY ratio), as a typical example. However, the embodiments of the present disclosure are not limited thereto. That is, the slope at which each of the first to fourth phase shift amounts $\theta 1$ to $\theta 4$ changes with respect to change of the power transmission amount (output DUTY ratio) may vary in accordance with a range of the power transmission amount (output DUTY ratio). In step-up charge, the first phase shift amount $\theta 1$ and the second phase shift amount $\theta 2$ may increase or decrease at different slopes. Similarly, in step-up discharge, the third phase shift amount $\theta 3$ and the fourth phase shift amount $\theta 4$ may increase or decrease at different slopes.

It should be noted that, for a plurality of embodiments described above, any combinations that are not referred to in the description as well as any appropriate combinations of the configurations described in the embodiments in a range that does not cause inconsistency or contradiction are initially intended at the time of filing.

Embodiments disclosed here should be understood as being illustrative rather than being limitative in all respects. The scope of the present disclosure is shown not in the foregoing description but in the claims, and it is intended that all modifications that come within the meaning and range of equivalence to the claims are embraced here.

REFERENCE SIGNS LIST 3 transformer, 3a first winding, 3b second winding, 10 first converter, 11 first positive electrode wire, 12 first negative electrode wire, 13 first smoothing capacitor, 14 first reactor, 20 second converter, 21 second positive electrode wire, 22 second negative electrode wire, 23 second smoothing capacitor, 24 second reactor, 25 reactor, 30 control circuit, 31, 33, 35 subtractor, 31a, 31b drive signal, 32, 34, 36 control calculator, 41 first bridge circuit, 42 second bridge circuit, 43 third bridge circuit, 44 fourth bridge circuit, 51 antiparallel diode, 52 parallel capacitor, 100, 101, 102 converter, 110, 120, 130 power conversion device, CP1, CP2 current path, P1, P2 power transmission amount, PS1 first DC power source, PS2 second DC power source (battery), Pr1 first reference value, Pr2 second reference value, Pr3 third reference value, Pr4 fourth reference value, Pref power transmission command value, Q1A to Q4A, Q1B to Q4B switching element, Tsw switching period, fsw switching frequency, td short-circuit prevention time.

The invention claimed is:

1. A DC/AC converter that performs bidirectional power transmission between a first DC power source and a second DC power source, the DC/DC converter comprising:
    a transformer having a first winding and a second winding magnetically coupled;
    a first converter connected between the first DC power source and the first winding; and
    a second converter connected between the second DC power source and the second winding, wherein
    the first converter includes a first bridge circuit and a second bridge circuit connected in parallel to each other to the first DC power source,
    each of the first bridge circuit and the second bridge circuit has a positive electrode-side switching element and a negative electrode-side switching element connected in series between a positive electrode and a negative electrode of the first DC power source, the first winding is connected between a connection point of the positive electrode-side switching element and the negative electrode-side switching element of the first bridge circuit and a connection point of the positive electrode-side switching element and the negative electrode-side switching element of the second bridge circuit, the second converter includes a third bridge circuit and a fourth bridge circuit connected in parallel to each other to the second DC power source, each of the third bridge circuit and the fourth bridge circuit has a positive electrode-side switching element and a negative electrode-side switching element connected in series between a positive electrode and a negative electrode of the second DC power source, and the second winding is connected between a connection point of the positive electrode-side switching element and the negative electrode-side switching element of the third bridge circuit and a connection point of the positive electrode-side switching element and the negative electrode-side switching element of the fourth bridge circuit, the DC/DC converter further comprising a control circuit to perform on/off drive control of the respective positive electrode-side switching elements and the respective negative electrode-side switching elements of the first converter and the second converter, wherein in first power transmission in which power is transmitted from the first DC power source to the second DC power source, in the first converter, the control circuit performs DC/AC power conversion by performing on/off drive control of the positive electrode-side switching element and the negative electrode-side switching element in each of the first bridge circuit and the second bridge circuit, and in the second converter, the control circuit performs AC/DC power conversion by stopping on/off drive of the positive electrode-side switching element and the negative electrode-side switching element in the third bridge circuit and performing on/off drive control of the positive electrode-side switching element and the negative electrode-side switching element in the fourth bridge circuit, and when a first power transmission amount by the first power transmission is smaller than a first reference value, the control circuit lowers a switching frequency for driving on and off of the respective positive electrode-side switching elements and the respective negative electrode-side switching elements of the first bridge circuit, the second bridge circuit, and the fourth bridge circuit, compared with when the first power transmission amount is equal to or greater than the first reference value.

2. The DC/DC converter according to claim 1, wherein in a region in which the first power transmission amount is equal to or greater than the first reference value, the control circuit keeps the switching frequency constant, and in a region in which the first power transmission amount is smaller than the first reference value, the control circuit lowers the switching frequency as the first power transmission amount decreases.

3. A power conversion device comprising a plurality of the DC/DC converters of claim 2, wherein the DC/DC converters are connected in series or parallel to one or a plurality of the first DC power sources and the second DC power sources.

4. The DC/DC converter according to claim 1, wherein when a switching period is to be changed to change the switching frequency, the control circuit sets a switching timing of the switching period in a period in which the first converter and the second converter respectively output zero voltage to the first winding and the second winding.

5. The DC/DC converter according to claim 4, wherein the control circuit sets, as a first phase shift amount, a phase shift amount of an on/off drive signal of a first diagonal element with respect to an on/off drive signal of a first reference element, the first reference element is the switching element on one of the positive electrode side and the negative electrode side of the first bridge circuit, and the first diagonal element is the switching element on the other of the positive electrode side and the negative electrode side of the second bridge circuit, the control circuit sets, as a second phase shift amount, a phase shift amount of an on/off drive signal of a second diagonal element that is the switching element on the one of the positive electrode side and the negative electrode side of the fourth bridge circuit with respect to an on/off drive signal of the first reference element, and in a region in which the first power transmission amount is smaller than the first reference value, the control circuit keeps a phase difference between the first phase shift amount and the second phase shift amount, the phase difference corresponding to a short-circuit prevention time in which both of the positive electrode-side switching element and the negative electrode-side switching element are turned off in each of the first bridge circuit, the second bridge circuit, and the fourth bridge circuit, and the control circuit decreases both of the first phase shift amount and the second phase shift amount in accordance with increase of the first power transmission amount.

6. The DC/DC converter according to claim 1, wherein in the first power transmission, in a region in which the first power transmission amount is equal to or greater than the first reference value, the control circuit drives on and off of the switching elements such that power is transmitted from the first DC power source to the second DC power source with step-up operation, and in a region in which the first power transmission amount is smaller than the first reference value, the control circuit drives on and off of the switching elements such that power is transmitted from the first DC power source to the second DC power source without the step-up operation.

7. The DC/DC: converter according to claim 1, wherein in second power transmission in which power is transmitted from the second DC power source to the first DC power source, in the second convener, the control circuit performs DC/AC power conversion by performing on/off drive control of the positive electrode-side switching element and the negative electrode-side switching element in each of the third bridge circuit and the fourth bridge circuit, and in the first convener, the control circuit performs AC/DC power conversion by stopping on/off drive of the positive electrode-side switching element and the negative electrode-side switching element in the first bridge circuit and performing on/off drive control of the positive electrode-side switching element and the negative electrode-side switching element in the second bridge circuit, and when a second power transmission amount by the second power transmission is smaller than a second reference value, the control circuit lowers a switching frequency for driving on and off of the respective switching elements of the second bridge circuit, the third bridge circuit, and the fourth bridge circuit, compared with when the first power transmission amount is equal to or greater than the first reference value.

8. The DC/DC converter according to claim 7, wherein the control circuit sets, as a first phase shift amount, a phase shift amount of an on/off drive signal of a first diagonal element with respect to an on/off drive signal of a first reference element, the first reference element is the switching element on one of the positive electrode side and the negative electrode side of the first bridge circuit, and the first diagonal element is the switching element on the other of the positive electrode side and the negative electrode side of the second bridge circuit, the control circuit sets, as a second phase shill amount, a phase shift amount of an on/off drive signal of a second diagonal element that is the switching element on the one of the positive electrode side and the negative electrode side of the fourth bridge circuit with respect to an on/off drive signal of the first reference element, and in the first power transmission, in a range in which the first power transmission amount is smaller than the first reference value, the control circuit decreases the first phase shift amount and the second phase shift amount from a maximum value when the first power transmission amount is zero, in accordance with increase of the first power transmission amount, and in a range in which the first power transmission amount is equal to or greater than the first reference value, the control circuit decreases the first phase shift amount and increases the second phase shill amount from the first phase shift amount and the second phase shift amount when the first power transmission amount is the first reference value, in accordance with increase of the first power transmission amount.

9. The DC/DC converter according to claim 8, wherein the control circuit sets, as a third phase shift amount, a phase shift amount of an on/off drive signal of the second diagonal element with respect to an on; off drive signal of a second reference element that is the switching element on one of the positive electrode side and the negative electrode side of the third bridge circuit, the control circuit sets, as a fourth phase shift amount, a phase shift amount of an on off drive signal of the first diagonal element with respect to an on/off drive signal of the second reference element, and in the second power transmission, in a range in which the second power transmission amount is smaller than the second reference value, the control circuit decreases the third phase shift amount and the fourth phase shift amount from a maximum value when the second power transmission amount is zero, in accordance with increase of the second power transmission amount, and in a range in which the second power transmission amount is equal to or greater than the second reference value, the control circuit decreases the third phase shift amount and increases the fourth phase shift amount from the third phase shift amount and the fourth phase shift amount when the second power transmission amount is the second reference value, in accordance with increase of the second power transmission amount.

10. The DC/DC converter according to claim 9, wherein in the second power transmission, when the second power transmission amount is in a range from the second reference value to a fourth reference value preset to a value greater than the second reference value, the control circuit decreases the third phase shift amount and increases the fourth phase shift amount from the third phase shift amount and the fourth phase shift amount when the second power transmission amount is the second reference value, in accordance with increase of the second power transmission amount, and in a range in which the second power transmission amount is greater than the fourth reference value, the control circuit increases the fourth phase shift amount from a value when the second power transmission amount is the fourth reference value, in accordance with increase of the second power transmission amount, and keeps the third phase shift amount at a value when the second power transmission amount is the fourth reference value.

11. The DC/DC converter according to claim 9, wherein the first reference value is preset to correspond to the first power transmission amount when the first phase shift amount and the second phase shift amount have a predetermined proportion to a switching period in which each of the switching elements is driven on and off once, and the second reference value is preset to the second power transmission amount at which the third phase shift amount and the fourth phase shift amount have the predetermined proportion to each switching period.

12. The DC/DC converter according to claim 11, wherein the predetermined proportion is preset to a value equal to or smaller than 25%.

13. The DC/DC converter according to claim 9, wherein the control circuit calculates an output DUTY ratio based on a power transmission amount between the first DC power source and the second DC power source, and changes the first phase shift amount, the second phase shift amount, the third phase shift amount, and the fourth phase shift amount, based on the calculated output DUTY ratio.

14. The DC/DC converter according to claim 8, wherein in the first power transmission, when the first power transmission amount is in a range from the first reference value to a third reference value preset to a value greater than the first reference value, the control circuit decreases the first phase shift amount and increases the second phase shift amount from the first phase shift amount and the second phase shift amount when the first power transmission amount is the first reference value, in accordance with increase of the first power transmission amount, and in a range in which the first power transmission amount is greater than the third reference value, the control circuit increases the second phase shift amount from a value when the first power transmission amount is the third reference value, in accordance with increase of the first power transmission amount, and keeps the first phase shift amount to a value when the first power transmission amount is the third reference value.

15. A power conversion device comprising a plurality of the DC/DC converters of claim 1,
   wherein the DC/DC converters are connected in series or parallel to one or a plurality of the first DC power sources and the second DC power sources.

\* \* \* \* \*